United States Patent
Zhou et al.

(10) Patent No.: US 12,475,131 B2
(45) Date of Patent: Nov. 18, 2025

(54) AUTOMATIC RECOMMENDATION OF ANALYSIS FOR DATASET

(71) Applicant: Microsoft Technology Licensing, LLC, Redmond, WA (US)

(72) Inventors: Mengyu Zhou, Redmond, WA (US); Shi Han, Beijing (CN); Dongmei Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 861 days.

(21) Appl. No.: 17/769,326

(22) PCT Filed: Oct. 27, 2020

(86) PCT No.: PCT/US2020/057441
§ 371 (c)(1),
(2) Date: Apr. 14, 2022

(87) PCT Pub. No.: WO2021/108053
PCT Pub. Date: Jun. 3, 2021

(65) Prior Publication Data
US 2023/0306035 A1  Sep. 28, 2023

(30) Foreign Application Priority Data
Nov. 27, 2019  (CN) ........................ 201911184158.8

(51) Int. Cl.
*G06N 5/00* (2023.01)
*G06F 16/22* (2019.01)
(Continued)

(52) U.S. Cl.
CPC ...... *G06F 16/2465* (2019.01); *G06F 16/2264* (2019.01); *G06N 5/01* (2023.01)

(58) Field of Classification Search
CPC ....................................................... G06N 5/01
See application file for complete search history.

(56) References Cited

U.S. PATENT DOCUMENTS

| 2013/0132139 | A1 | 5/2013 | Yeung et al. |
| 2015/0339572 | A1* | 11/2015 | Achin ................. G06N 5/04 706/46 |
| 2023/0306035 | A1 | 9/2023 | Mengyu et al. |

FOREIGN PATENT DOCUMENTS

| CN | 107992503 A | 5/2018 |
| KR | 20170087434 A | 7/2017 |

OTHER PUBLICATIONS

Sellam et al ("Semi-Automated Exploration of Data Warehouses Thibault" 2015) (Year: 2015).*

(Continued)

*Primary Examiner* — Lut Wong
(74) *Attorney, Agent, or Firm* — Schwegman Lundberg & Woessner, P.A.

(57) ABSTRACT

According to implementations of the subject matter described herein, there is provided a solution for automatic recommendation of analysis for a dataset. In this solution, dimension feature information of dimensions of a dataset and operation feature information of candidate analysis operations are extracted. Respective metrics of candidate combinations of the dimensions and candidate analysis operations being suitable for defining an analysis pattern for the dataset are determined based on the dimension and operation feature information. The analysis pattern comprises at least one dimension to be analyzed and at least one analysis operation to be performed on the at least one dimension. A recommendation on an analysis pattern for the dataset is provided based on the determined respective metrics, to indicate a candidate combination. In this way, it is possible to assess and provide a suitable analysis pattern for a given dataset, thereby facilitating quick completion of the data analysis task.

20 Claims, 10 Drawing Sheets

(51) Int. Cl.
   *G06F 16/2458* (2019.01)
   *G06N 5/01* (2023.01)

(56) References Cited

OTHER PUBLICATIONS

Rao et al ("Feature selection based on artificial bee colony and gradient boosting decision tree" Nov. 5, 2018) (Year: 2018).*

Second Office Action Received for Chinese Application No. 201911184158.8, mailed on Jul. 4, 2024, 8 pages. (English Translation Provided).

"Design a multidimensional business intelligence (BI) semantic model", Retrieved From: https://www.microsoftpressstore.com/articles/article.aspx?p=2812063, Sep. 7, 2017, 31 Pages.

"GPU optimized virtual machine sizes", Retrieved From: http://web.archive.org/web/20180401121227/https://docs.microsoft.com/en-us/azure/virtual-machines/linux/sizes-gpu, Apr. 1, 2018, 4 Pages.

"Open-XML-SDK", Retrieved from: https://github.com/OfficeDev/Open-XML-SDK, Retrieved on: Jun. 3, 2022, 5 Pages.

"Ornstein-Uhlenbeck process", Retrieved From: https://web.archive.org/web/20190712024423/https:/en.wikipedia.org/wiki/Ornstein%E2%80%93Uhlenbeck_process, Jul. 12, 2019, 8 Pages.

"Pivot table", Retrieved from: https://en.wikipedia.org/wiki/Pivot_table, Retrieved on: Jun. 3, 2022, 7 Pages.

"RabbitMQ", Retrieved From: https://web.archive.org/web/20190718134634/https:/www.rabbitmq.com/, Jul. 18, 2019, 6 Pages.

Balog, et al., "Deepcoder: Learning to write programs", In Proceedings of 5th International Conference on Learning Representations, Apr. 24, 2017, pp. 1-19.

Covington, et al., "Deep Neural Networks for YouTube Recommendations", In Proceedings of the 10th ACM Conference on Recommender Systems, Sep. 15, 2016, pp. 191-198.

Devlin, et al., "BERT: Pre-training of Deep Bidirectional Transformers for Language Understanding", In Repository of arXiv:1810.04805v1, Oct. 11, 2018, 14 Pages.

He, et al., "Layer-wise Coordination Between Encoder and Decoder for Neural Machine Translation", In Proceedings of the 32nd International Conference on Neural Information Processing Systems, Dec. 3, 2018, pp. 1-11.

Hu, et al., "Reinforcement Learning to Rank in E-Commerce Search Engine: Formalization, Analysis, and Application", In Proceedings of the 24th ACM SIGKDD International Conference on Knowledge Discovery & Data Mining, Aug. 19, 2018, pp. 368-377.

Lanza-Cruz, et al., "Modeling Analytical Streams for Social Business Intelligence", In Journal of Informatics 2018, vol. 5, Issue 3, Aug. 1, 2018, 17 Pages.

Lillicrap, et al., "Continuous control with deep reinforcement learning", In Proceedings of 4th International Conference on Learning Representations, May 2, 2016, pp. 1-14.

Liu, et al., "Related Pins at Pinterest: The Evolution of a Real-World Recommender System", In Proceedings of the 26th International Conference on World Wide Web Companion, Apr. 3, 2017, pp. 583-592.

Liu, et al., "Table-to-text generation by structure-aware seq2seq learning", In Proceedings of the of the Thirty-Second AAAI Conference on Artificial Intelligence, vol. 32, Issue 1, Apr. 26, 2018, pp. 4881-4888.

Marcel, et al., "A Survey of Query Recommendation Techniques for Datawarehouse Exploration", In Proceedings of the 7th Francophone Days on Data Warehousing and Online Analysis, Jun. 2011, 16 Pages.

Mnih, et al., "Human-Level Control Through Deep Reinforcement Learning", In Journal of Nature, vol. 518, Issue 7540, Feb. 25, 2015, pp. 529-533.

Neumayr, et al., "Semantic Cockpit: An Ontology-Driven, Interactive Business Intelligence Tool for Comparative Data Analysis", In Proceedings of International Conference on Conceptual Modeling, Oct. 31, 2011, pp. 55-64.

"International Search Report and the Written Opinion Issued in PCT Application No. PCT/US20/057441", Mailed Date: Jan. 29, 2021, 11 Pages.

Revell, Nicholas, "Power BI: Realise The Benefits of Self-Service BI", Retrieved From: http://web.archive.org/web/20201127181441/https://www.reply.com/solidsoft-reply/en/content/power-bi-realise-the-benefits-of-self-service-bi, Nov. 27, 2020, 4 Pages.

Milo, et al., "Next-Step Suggestions for Modern Interactive Data Analysis Platforms", In Proceedings of the 24th ACM SIGKDD International Conference on Knowledge Discovery & Data Mining, Aug. 19, 2018, pp. 576-585.

Sutton, et al., "Reinforcement Learning: An Introduction", In Publication of MIT Press, Nov. 13, 2018, 538 Pages.

Tang, et al., "Extracting Top-K Insights from Multi-Dimensional Data", In Proceedings of the ACM International Conference on Management of Data, May 14, 2017, 16 Pages.

Vaswani, et al., "Attention Is All You Need", In Proceedings of 31st Conference on Neural Information Processing Systems, Dec. 4, 2017, 11 Pages.

Vijayakumar, et al., "Neural-Guided Deductive Search for Real-Time Program Synthesis from Examples", In Proceedings of 6th International Conference on Learning Representations, Apr. 30, 2018, pp. 1-15.

Viswanathan, et al., "CAL: A Generic Query and Analysis Language for Data Warehouses", In Proceedings of 20th International Conference on Software Engineering and Data Engineering, Jun. 20, 2011, 6 Pages.

Wiseman, et al., "Challenges in data-to-document generation", In Repository of arXiv:1707.08052v1, Jul. 25, 2017, 13 Pages.

Yu, et al., "TypeSQL: Knowledge-based Type-Aware Neural Text-to-SQL Generation", In Repository of arXiv:1804.09769v1, Apr. 25, 2018, 7 Pages.

Wzheng, et al., "DRN: A Deep Reinforcement Learning Framework for News Recommendation", In Proceedings of the World Wide Web Conference, Apr. 23, 2018, 10 Pages.

Zhong, et al., "SEQ2SQL: Generating Structured Queries From Natural Language Using Reinforcement Learning", In repository of arXiv:1709.00103, Nov. 9, 2017, 12 Pages.

Office Action Received for Chinese Application No. 201911184158.8, mailed on Sep. 24, 2024, 04 pages (English Translation Provided).

Office Action Received for Chinese Application No. 201911184158.8, mailed on Jan. 24, 2024, 15 pages (English Translation Provided).

* cited by examiner

310 ↘

|  | Region | Total |
|---|---|---|
| SalesRep | Sales |  |
| Total |  |  |

|  | Region | Total |
|---|---|---|
| SalesRep | Sales |  |
| Total |  |  |

|  | SalesRep | Average |
|---|---|---|
| Date | Sales |  |
| Average |  |  |

| SalesRep |
|---|
| Sales |
| Total |

"SUM SALES BY SALES REPRESENTATIVE AND REGION"

|        | NorthWest | Sourthwest | West | Total |
|--------|-----------|------------|------|-------|
| June   | 1 269     |            | 2542 | 3811  |
| Chin   | 1041      | 1423       | 1476 | 3940  |
| Freddy | 1141      |            | 376  | 1517  |
| Gigi   | 1340      | 1694       | 1821 | 4855  |
| Total  | 4791      | 3117       | 6215 | 14123 |

510 ⬈

[Search box]

1. SUM ("Sales") by ("SalesRep") and ("Regions")

2. SUM("Sales") by ("SalesRep")

3. SUM("Sales") by ("Regions")

4. Average ("Sales") by ("Date") and ("SalesRep")

SUM ("Sales")

1. SUM ("Sales") by ("SalesRep") and ("Regions")

2. SUM("Sales") by ("SalesRep")

3. SUM("Sales") by ("Regions")

FIG. 5B

AUTOMATIC RECOMMENDATION OF ANALYSIS FOR DATASET

CROSS-REFERENCE TO RELATED APPLICATION

This application is a U.S. National Stage Filing under 35 U.S.C. 371 of International Patent Application Serial No. PCT/US2020/057441, filed Oct. 27, 2020, and published as WO 2021/108053 A1 on Jun. 3, 2021, which claims priority to Chinese Application No. 201911184158.8, filed Nov. 27, 2019, which applications and publication are incorporated herein by reference in their entirety.

BACKGROUND

Data analysis has been widely applied as important means to support knowledge discovery and decision making. In practical applications, people often organize a dataset in form of a data table for visual presentation and sharing of data. In addition, people may sometimes want to further mine into the dataset to derive more desired information therefrom. Some dataset editing or analysis tools are developed to perform operations on raw datasets or data tables. Users are generally required to be skilled in analysis and in operating various editing or analysis tools, and the whole interaction process is often time-consuming.

SUMMARY

According to implementations of the subject matter described herein, there is provided a solution for automatically generating an analysis recommendation for a dataset. In this solution, dimension feature information of a plurality of dimensions of a dataset and operation feature information of a plurality of candidate analysis operations are extracted. The plurality of dimensions of the dataset comprise corresponding data items. Respective metrics of a plurality of candidate combinations of the plurality of dimensions and the plurality of candidate analysis operations being suitable for defining an analysis pattern for the dataset are determined based on the dimension feature information and the operation feature information, the analysis pattern comprising at least one dimension to be analyzed and at least one analysis operation to be performed on the at least one dimension. A recommendation on an analysis pattern for the dataset is provided based on the determined respective metrics, the recommendation indicating at least one of the plurality of candidate combinations. In this way, it is possible to assess and provide a suitable analysis pattern for a given dataset, thereby facilitating y quick completion of a data analysis task.

The Summary is to introduce a selection of concepts in a simplified form that are further described below in the Detailed Description. The Summary is neither intended to identify key features or essential features of the subject matter described herein, nor is it intended to be used to limit the scope of the subject matter described herein.

BRIEF DESCRIPTION OF THE DRAWINGS

FIGS. 3A-3D illustrate example presentations of candidate combinations determined by the candidate assessment module and recommended by the recommendation provision module in accordance with some implementations of the subject matter described herein;

FIGS. 5A-5B illustrate schematic diagrams of example query interfaces for users to input an analysis request in accordance with some implementations of the subject matter described herein;

Throughout the drawings, the same or similar reference symbols refer to the same or similar elements.

DETAILED DESCRIPTION OF EMBODIMENTS

Figure 1:
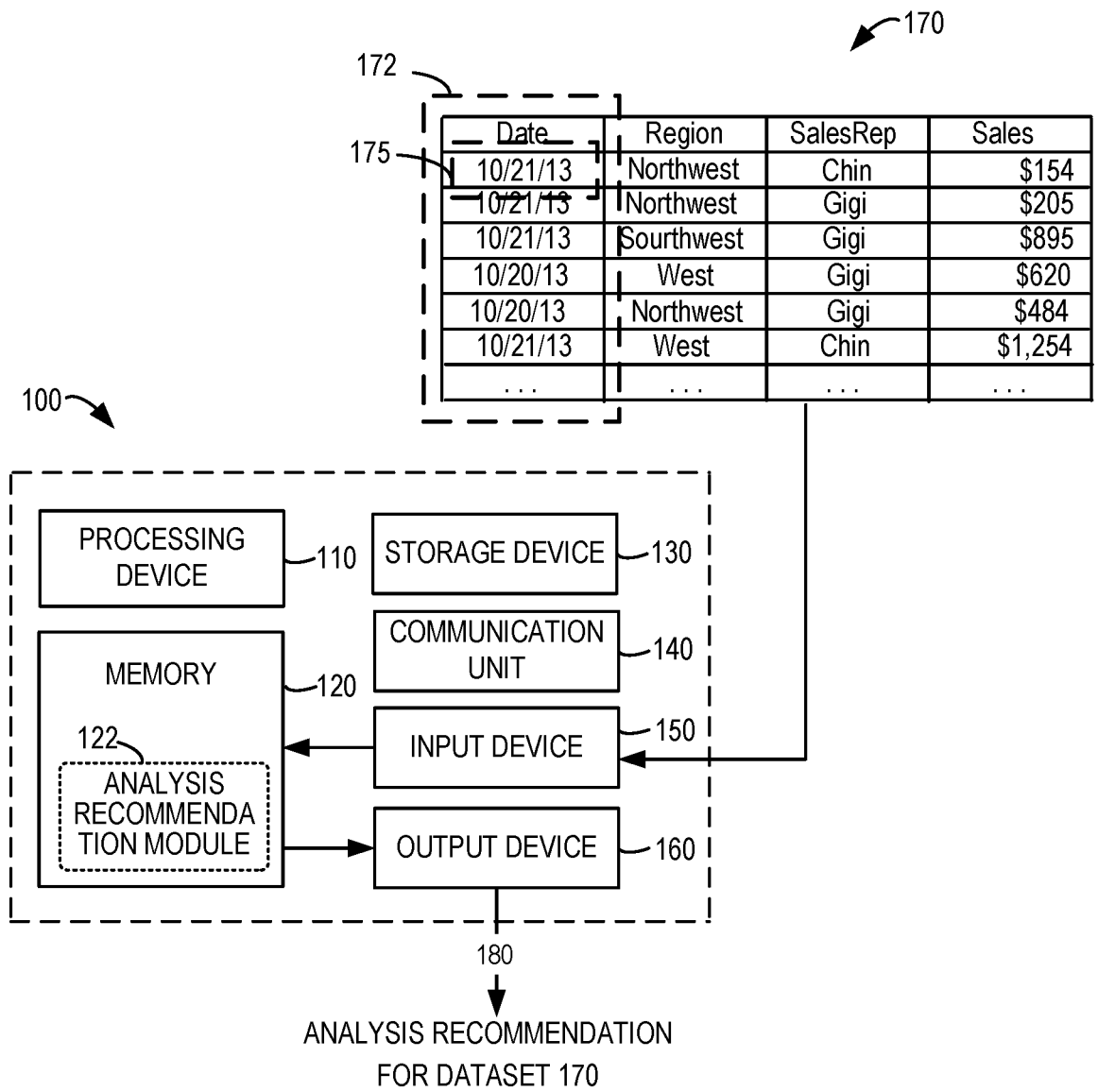
FIG. 1 illustrates a block diagram of a computer environment in which various implementations of the subject matter described herein can be implemented.

Principles of the subject matter described herein will now be described with reference to some example implementations. It is to be understood that these implementations are described only for the purpose of illustration and help those skilled in the art to better understand and thus implement the subject matter described herein, without suggesting any limitations to the scope of the subject matter disclosed herein.

As used herein, the term "includes" and its variants are to be read as open terms that mean "includes, but is not limited to." The term "based on" is to be read as "based at least in part on." The terms "an implementation" and "one implementation" are to be read as "at least one implementation." The term "another implementation" is to be read as "at least one other implementation." The term "first," "second," and the like may refer to different or the same objects. Other definitions, either explicit or implicit, may be included below.

As used herein, the term "dimension" refers to a data portion having a certain attribute in a dataset, and a multi-dimensional dataset includes a plurality of dimensions. The term "data item" is a data unit in each dimension of the dataset. In one example, the multi-dimensional dataset may be presented in the form of a data table, where data corresponding to one dimension of the dataset may correspond to a column of the data table if the dataset is presented as a data table in a column-wise order or a row of the data table if the dataset is presented as a data table in a row-wise order. The data items corresponding to each dimension may be cells in a column or a row of the data table. In another example, the multi-dimensional dataset may also be represented in other forms as such as in the form of a structured database.

As used herein, a "data table" refers to an editable table in an electronic document tool. A data table consists of cells arranged in rows and columns, and at least one cell of the data table is filled with data (also referred to as content). The electronic document providing the editable data table may, for example, include a spreadsheet, a text document with a data table insertable, a presentation document and so on. Many electronic document tools, such as spreadsheet applications, word-processing applications, and presentation documents applications, may provide editing on data, structure and format of the data table.

As used herein, a "data table in a column-wise order" refers to a data table having a table header in the column direction of the table only, to indicate column names of respective columns. A "data table in a row-wise order" refers to a data table having a table header in the row direction of the table only, to indicate row names of respective rows. The data table in column-wise order or in row-wise order is sometimes referred to as a database table. A data table having table headers in both the column direction and row direction is referred to as a pivot table.

As used herein, a "machine learning model" may also be referred to as a "learning model", "learning network", "network model", or "model." A "neural network" or "neural network model" is a deep machine learning model. A parameter set of the machine learning model is determined through training based on training data. The machine learning model maps a received input to a corresponding output using the trained parameter set. Therefore, the training process of a machine learning model may be considered as learning, from the training data, a mapping or association between the input and the output.

As mentioned above, currently, if it is desired to perform analysis on data in an existing dataset or data table, the user needs to be familiar with the functions provided by the editing or analysis tool of the data table and has to perform multiple steps to select a data portion to be analyzed from the data table. Therefore, it is desired to provide a solution for automatic recommendation of an analysis operation for a dataset.

Example Environment

FIG. 1 illustrates a block diagram of a computing device 100 in which various implementations of the subject matter described herein can be implemented. It would be appreciated that the computing device 100 as shown in FIG. 1 is merely provided as an example, without suggesting any limitation to the functionalities and scope of implementations of the subject matter described herein. As shown in FIG. 1, the computing device 100 includes a computing device 100 in the form of a general-purpose computing device. Components of the computing device 100 can include, but are not limited to, one or more processors or processing units 110, a memory 120, a storage device 130, one or more communication units 140, one or more input devices 150, and one or more output devices 160.

In some implementations, the computing device 100 may be implemented as various user terminal or server terminal. The service terminal may be any server, large-scale computing device, and the like provided by various service providers. The user terminal may, for example, be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, TV receiver, radio broadcast receiver, E-book device, gaming device, or any combination thereof, including the accessories and peripherals of these devices, or any combination thereof. It is also contemplated that the computing device 100 can support any type of interface to a user (such as "wearable" circuitry and the like).

The processing unit 110 can be a physical or virtual processor and can implement various processes based on programs stored in the memory 120. In a multi-processor system, a plurality of processing units execute computer-executable instructions in parallel so as to improve the parallel processing capability of the computing device 100. The processing unit 110 may also be referred to as a central processing unit (CPU), a microprocessor, a controller, or a microcontroller.

The computing device 100 usually includes various computer storage medium. The computer storage medium may be any available medium accessible by the computing device 100, including but not limited to, volatile and non-volatile medium, or detachable and non-detachable medium. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The storage device 130 may be any detachable or non-detachable medium and may include machine-readable medium such as a memory, a flash drive, a magnetic disk, or any other medium, which can be used for storing information and/or data and are accessible by the computing device 100.

The computing device 100 may further include additional detachable/non-detachable, volatile/non-volatile memory medium. Although not shown in FIG. 1, it is possible to provide a disk drive for reading from or writing into a detachable and non-volatile disk, and an optical disk drive for reading from and writing into a detachable non-volatile optical disc. In such case, each drive may be connected to a bus (not shown) via one or more data medium interfaces.

The communication unit 140 communicates with a further computing device via the communication medium. In addition, the functions of components in the computing device 100 may be implemented by a single computing cluster or multiple computing machines that can communicate with each other via communication connections. Therefore, the computing device 100 can operate in a networked environment using logic connections with one or more other servers, network personal computers (PCs), or further general network nodes.

The input device 150 may include one or more of various input devices, such as a mouse, keyboard, tracking ball, voice-input device, and the like. The output device 160 may include one or more of various output devices, such as a display, loudspeaker, printer, and the like. By means of the communication unit 140, the computing device 100 can further communicate with one or more external devices (not shown) such as storage devices and display devices, one or more devices that enable the user to interact with the computing device 100, or any devices (such as a network card, a modem and the like) that enable the computing device 100 to communicate with one or more other computing devices, if required. Such communication may be performed via input/output (I/O) interfaces (not shown).

In some implementations, as an alternative of being integrated on a single device, some or all components of the computing device 100 may also be arranged in the form of cloud computing architecture. In the cloud computing architecture, the components may be provided remotely and work together to implement the functionalities discussed in the subject matter described herein. In some implementations, the cloud computing provides computing, software, data access and storage service, without requiring end users to be aware of the physical locations or configurations of the systems or hardware provisioning these services. In various implementations, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored in a server at a remote position. The computing resources in the cloud computing environment may be aggregated or distributed at various locations of remote data centers. Cloud computing infrastructure may provision the services through a shared data center, though they act as a single access point for the users. Therefore, the cloud computing architecture may be used to provide the components and functionalities described herein from a service provider at a remote location. Alternatively, they may be provided from a conventional server or may be installed directly or otherwise on a client device.

The computing device 100 can be used to implement automatic recommendation of analysis for a dataset in various implementations of the subject matter described herein. The memory 120 may include one or more modules having one or more program instructions. These modules can be accessed and executed by the processing unit 110 to perform the functionalities of various implementations described herein. For example, the memory 120 may include an analysis recommendation module 122 for generating a recommendation of an analysis operation for a dataset.

To generate an analysis recommendation, the computing device 100 can receive a data table 170 via the input device 150. The data table 170 includes a plurality of dimensions each including data items of a corresponding type. In the example shown in FIG. 1, the dataset 170 is presented in the form of a column-wise data table, where a respective column of the table corresponds to one dimension 172 of the dataset 170. In this specific example, the dataset 170 includes four dimensions corresponding to four columns, indicating "Date", "Region", "SalesRep," and "Sales," respectively. Each dimension 172 of the dataset 170 includes one or more corresponding data items 175. For example, the "Date" dimension includes data items indicating respective dates, and the "Sales" dimension includes data items indicating respective amounts of sales. The data items in each dimension 172 of the dataset 170 are filled in respective cells of the table.

It would be appreciated that although FIG. 1 illustrates a data table in column-wise order, the input dataset 170 to be processed may be presented or arranged in other forms, such as a data table in a row-wise order or a pivot table. In the data table in row-wise order, each row is considered a dimension of the dataset. If an original dataset is in the form of pivot table, it may also be converted into a data table in column-wise order or a data table in row-wise order by means of table conversion to facilitate the dimension division. In addition, it is noted that data tables in column-wise order may also be converted to data tables in row-wise order or vice versa. In some implementations, in order to implement the automatic recommendation of the analysis operation on the dataset as described herein, the dataset to be analyzed may be converted into a data table in column-wise order for subsequent processing. It would be appreciated that the form of the data table, the data included in the data table, and the format of the data table illustrated in FIG. 1 are merely examples.

The input dataset 170 is provided to the analysis recommendation module 122 to generate an analysis recommendation 180 for the dataset 170 by the analysis recommendation module 122. The analysis recommendation module 122 may optionally output the generated analysis recommendation 180 via the output device 160. In some implementations, the generated analysis recommendations 180 may be selected, for example, in response to the user input, and applied to the dataset 170 for data analysis. The analysis result may be output by the output device 160.

Reference is made hereinafter to FIGS. 2-9 to describe the determination of the analysis recommendation for the dataset 170 by the analysis recommendation module 122 in detail.

Work Principles and Basic Implementation Architecture

According to implementations of the subject matter described herein, a solution of automatic recommendation of analysis for a dataset is proposed. In this solution, an analysis pattern for the dataset is defined by at least the following two aspects: a dimension(s) to be analyzed and an analysis operation(s) to be performed on the dimension(s) to be analyzed. The dimension(s) to be analyzed in the analysis pattern may include one or more dimensions, and the analysis operation(s) to be performed may also include one or more analysis operations. For a given dataset, feature information of the dataset is extracted and is used to determine whether some candidate combinations of a plurality of dimensions of the dataset and a plurality of candidate analysis operations are suitable for defining an analysis pattern for the dataset. Whether a candidate combination is suitable for defining an analysis pattern for the given dataset can be measured by a respective metric. A recommendation on the analysis pattern for the given dataset can be provided based on the respective metrics of the plurality of candidate combinations, the recommendation at least indicating at least one of the plurality of candidate combinations.

Through the solution, the analysis pattern suitable for the given dataset may be assessed and provided. Such a recommendation may facilitate the analysis task of the dataset, accelerate the analysis result of the dataset to be obtained, and improve the analysis efficiency.

Figure 2:
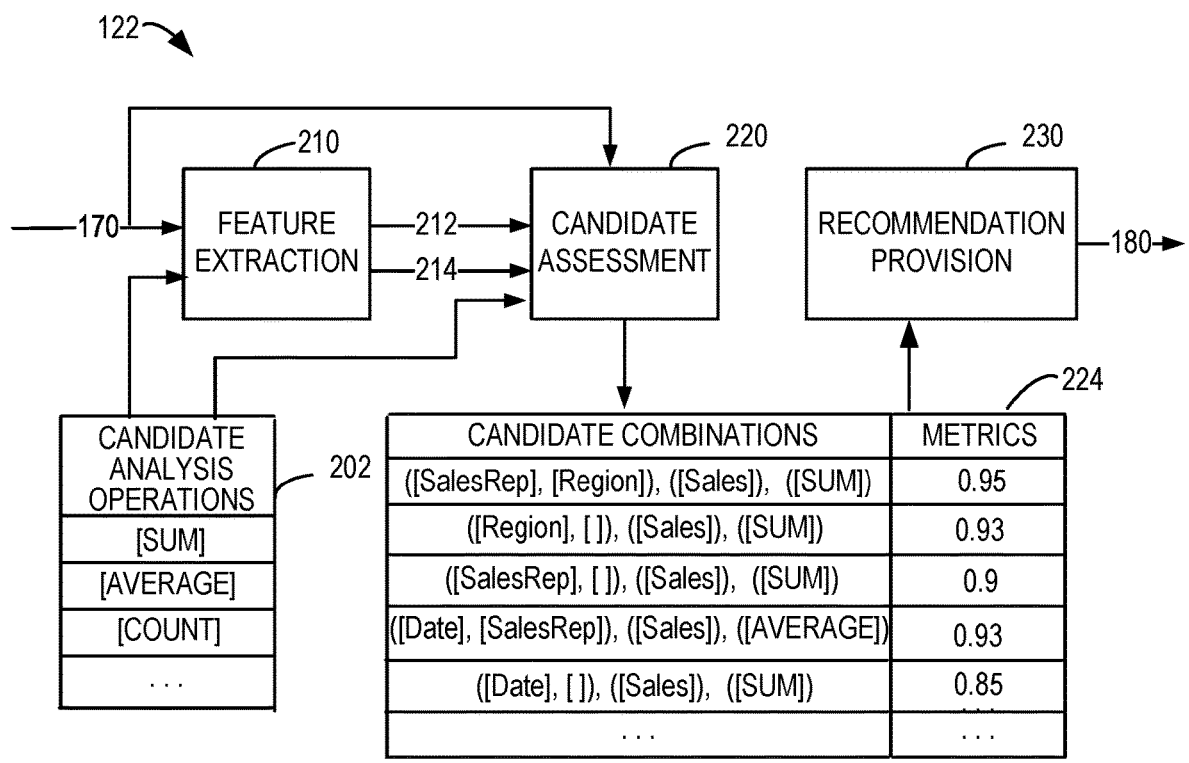
FIG. 2 illustrates a block diagram of an analysis recommendation module in accordance with an implementation of the subject matter described herein.

FIG. 2 illustrates an example structure of the analysis recommendation module 122 in accordance with some implementations of the subject matter described herein. As shown in the figure, the analysis recommendation module 122 includes a feature extraction module 210, a candidate assessment module 220, and a recommendation provision module 230.

The feature extraction module 210 obtains the dataset 170 to be processed, and extracts dimension feature information 212 of a plurality of dimensions 172 of the dataset 170. The respective dimensions of the dataset 170 is considered upon extraction of the dimension feature information. In the example of FIG. 1, four dimensions of the dataset 170, including the dimensions "Date", "Region", "SalesRep," and "Sales are all considered. The extracted dimension feature information 212 may be related to one or more aspects of the respective dimensions of the dataset 170 and is used to characterize the respective dimension itself and their relationship, for example, a similarity between two dimensions, mutual information between two dimensions, and the like.

In some implementations, if the dataset 170 includes dimension names of one or more dimensions such as column names in a header of a data table, the feature extraction module 210 may extract semantic feature representations of the respective dimension names to characterize semantics of the dimension names. The extraction of the semantic feature representations of the dimension names may, for example, comprise vectorizing the dimension names by using a natural language processing technique to obtain a combination of embedding representations (also referred to as "word vectors") of words in the dimension names as the semantic feature representations. Alternatively, or in addition, the feature extraction module 210 may extract data distribution feature representations of the data items corresponding to the plurality of dimensions, to characterize some statistics features of the data items of the dataset 170. The data distribution feature representations may be obtained through statistics. Examples of the data distribution feature representations of the data items of the dataset 170 are listed in Table 1 below.

TABLE 1

Examples of data distribution feature representations of data items

| Data distribution feature representations | Meaning of the representations | Types of the representations |
| --- | --- | --- |
| AggrPercentFormatted | Proportion of data items in the percentage format | Numeric |
| Aggr01Ranged | Proportion of numerical values in a range between 0 to 1 | Numeric |
| Aggr0100Ranged | Proportion of numerical values in a range between 0 to 100 | Numeric |
| AggrIntegers | Proportion of integer values | Numeric |
| AggrNegative | Proportion of negative values | Numeric |
| CommonPrefix | Proportion of most common prefix digit(s)/character(s) | Numeric and character string to indicate corresponding prefix(s) |
| CommonSuffix | Proportion of most common suffix digit(s)/character(s) | Numeric and character string to indicate corresponding suffix(s) |
| KeyEntropy | Entropy by numerical values | Numeric and character string to indicate corresponding values |
| CharEntropy | Entropy by digits/characters | Numeric and character string to indicate corresponding digits or characters |
| ChangeRate | Proportion of different adjacent values | Numeric and s character string to indicate corresponding adjacent values |
| PartialOrdered | Maximum proportion of increasing or decreasing adjacent values | Numeric |
| Cardinality | Proportion of distinct data items | Numeric |
| Spread | Cardinality divided by a range | Numeric and character string to indicate a corresponding range |
| Major | Proportion of most frequent data item(s) | Numeric and character string to indicate corresponding data item(s) |
| Benford | Distance of the first digit distribution to real-life average | Numeric |

TABLE 1-continued

Examples of data distribution feature representations of data items

| Data distribution feature representations | Meaning of the representations | Types of the representations |
| --- | --- | --- |
| OrderedConfidence | Indicator of sequentiality | Numeric |

The feature extraction module 210 may vectorize the above data distribution feature representations into vectorized representations for use. Of course, in addition to the representation manners listed in Table 1, other manners of the data distribution feature representations may also be utilized as long as the specific meanings of these representations can be differentiated. It would be appreciated that other aspects of the statistics features may also be extracted from the data items of the dataset 170 and used as data distribution feature representations. Implementations of the subject matter described herein are not limited in this regard.

In some implementations, in addition to the dimension feature information 212 of the dimensions 172 of the dataset 170, the feature extraction module 210 may further extract operation feature information 214 of a plurality of predetermined candidate analysis operations. The plurality of candidate analysis operations are considered as analysis operations that may be applied to analyze the dataset. Those analysis operations may be general or specific to a certain field of the dataset, or available in a certain tool/application for editing or modifying the dataset 170. FIG. 2 lists some examples of candidate analysis operations and their associated descriptive information.

TABLE 2

Candidate analysis operations and corresponding descriptive information

| Names of candidate analysis operations | Descriptive information |
| --- | --- |
| Sum operation | Sum of a plurality of numeric data items |
| Average operation | Calculate an average value of a plurality of numeric data items |
| Count operation | Count the number of data items in a certain portion of the dataset |
| Product operation | Calculate a product of a plurality of numeric data items |
| CountNum operation | Count the number of data items including digits within a certain portion of the dataset |
| Max operation | Determine a maximum value in a set of numeric data items |
| Min operation | Determine a minimum value in a set of numeric data items |
| StdDev operation | Calculate a standard deviation of given numeric data items |
| Var operation | Calculate a variance of given numeric data items |
| StdDevP operation | Calculate an overall standard deviation of an entire population of numeric data items |
| VarP operation | Calculate an overall variance of an entire population of given numeric data items |
| Filtering operation | Filter data items based on a condition expression which may be defined as needed |
| Grouping operation | Further discretize the numeric data items such that each group includes one or more of the numeric data items after the grouping |

It would be appreciated that the analysis operations listed above are merely examples. There may also be any other analysis operations applicable for data analysis, for example candidate analysis operations applicable in analysis tasks such as data statistics, data clustering/fitting and data classification. Implementations of the subject matter described herein are not limited in this regard.

Upon extraction of the operation feature information 214, the feature extraction module 210 may extract semantic feature representations of the operation names and/or descriptive information of these candidate analysis operations 202 to characterize the semantics of the respective candidate analysis operations. Compared with the operation names, the descriptive information provides more detailed descriptions of one or more aspects of the corresponding candidate analysis operations such as their functions, application ranges, application effects, and/or the like.

In addition to the dimension feature information 212 of the dimensions of the dataset 170 and the operation feature information 214 of the candidate analysis operations, in some implementations of the subject matter described herein, the feature extraction module 210 may further extract feature representations of other aspects, which will be discussed below.

The dimension feature information 212 and the operation feature information 214 extracted by the feature extraction module 210 are provided to the candidate assessment module 220. The candidate assessment module 220 assesses the plurality of candidate combinations of the plurality of dimensions 172 of the dataset 170 and the plurality of candidate analysis operations 202 based on the dimension feature information 212 and operation feature information 214, to determine the respective metrics 224 of these candidate combinations. A metric 224 of a candidate combination is used to measure the reliability of how the corresponding candidate combination is suitable for defining an analysis pattern for the dataset 170. In some implementations, the metric 224 of the candidate combination may, for example, be represented as a score from a value range. A higher score of a candidate combination means that this candidate combination is more suitable for defining an analysis pattern for the dataset 170. Of course, other metrics are also feasible, for example, by ranking different candidate combinations with different levels.

As mentioned above, one analysis pattern for the dataset 170 may include at least one dimension to be analyzed and at least one analysis operation. In some embodiments, the dimension to be analyzed in the analysis pattern may include: at least one grouping dimension for grouping data items and/or at least one numeric dimension including numeric data items. Such a definition for the analysis pattern can clearly and accurately represent a general mode when performing analysis on a given dataset. According to implementations of the subject matter described herein, the analysis pattern determined for the dataset is such an analysis pattern that is common in semantics and data distribution. The common analysis pattern may be obtained by machine learning from various existing analyses on massive datasets. For example, existing analyses on various datasets may be obtained from the Internet or databases. Therefore, as discussed in some embodiments below, a machine learning model may learn the common analysis patterns, and then such a machine learning model can be used to determine a suitable analysis pattern for a given dataset.

For example, if the user wants to analyze the sales in the dataset 170 in the example of FIG. 1, he/she may select the dimension "Sales" corresponding to the sales, then select the dimensions "SalesRep" and "Region" and then select the "Sum" operation in order to sum the sales by sales representative and by region. In such an analysis pattern, the dimensions "SalesRep" and "Region" are grouping dimensions for grouping the data items, the dimension "Sales" is a numeric dimension including the numeric data items to be analyzed, and the "Sum" operation is an analysis operation to be applied on the dimension "Sales" with respect to the dimensions "SalesRep" and "Region."

In some cases, depending on the specific analysis operation, the dimension to be analyzed may only include a numeric dimension, which means that all the data items in the numeric dimension are directly analyzed. In some cases, the dimension to be analyzed may include no numeric dimension. For example, the "Count" operation may be applied to count the number of data items in a certain grouping dimension or the number of data items in the entire dataset.

In some implementations, an analysis pattern may include two or more analysis operations, where the execution results of one or more previous analysis operations are used for analysis in a following analysis operation. For example, an analysis pattern may include a "Filtering" operation and a "Sum" operation, where the "Filtering" operation may be applied to filter one or more data items from a grouping dimension, removing the numeric data items corresponding to the filtered-out groups, and then the "Sum" operation may be applied to numeric data items in other groups. As another example, an analysis pattern may include a "Grouping" operation and an "Average" operation, where the "Grouping" operation may be applied to further group multiple data items in a grouping dimension into several groups, and then the "Average" operation may be applied to average the numeric data items in the respective groups after the further grouping.

Due to the variety of datasets, the number and types of dimensions contained in respective datasets may be varied. Therefore, there is a need to automatically assess whether each dimension of the dataset is suitable for serving as a grouping dimension or a numeric dimension. In addition, there is also a need to assess whether combinations of the dimensions and candidate analysis operations can define suitable analysis patterns for the dataset. In the implementations of the subject matter described herein, for a given dataset 170, the candidate assessment module 220 is to assess whether different candidate combinations of the plurality of dimensions 172 of the dataset 170 and the plurality of candidate analysis operations are suitable for defining analysis patterns for the dataset 170. Candidate combinations may include at least one dimension of the dataset 170 to be analyzed (if a plurality of dimensions to be analyzed are included, grouping dimensions and numeric dimensions are differentiated) and at least one of the plurality of candidate analysis operations.

In some implementations, the candidate assessment module 220 may explore a plurality of possible candidate combinations of the dimensions 172 of the dataset 170 and the candidate analysis operations, each candidate combination being used to completely define one analysis pattern for the dataset 170. In other implementations, the candidate assessment module 220 may obtain a specification on one or more portions of the candidate combinations. For example, a user may input one or more dimensions expected to be analyzed, and/or one or more analysis operations expected to be performed. As a further example, in some automatic analysis tasks for the dataset 170, it may be expected to determine whether one or more dimensions of the dataset 170 or a certain analysis operation is suitable for defining an analysis pattern for the dataset. If such a pre-specification may be obtained, in performing the assessment, the candidate assessment module 220 may determine each of the plurality of candidate combinations to include one or more pre-specified dimensions and one or more analysis operations expected to be performed.

Implementations of the subject matter described herein provide various solutions for determining the respective metrics 224 of the candidate combinations being suitable for defining the analysis patterns for the dataset 170, which will be described in detail below. For the example dataset 170 of FIG. 1, FIG. 2 illustrates an example of respective metrics 224 of some candidate combinations determined by the candidate assessment module 220. As shown in FIG. 2, the candidate assessment module 220 may determine a candidate combination including ([SalesRep], [Region]), ([Sales]), and ([SUM]), and a metric corresponding to the candidate combination. In this candidate combination, the dimensions within the first parentheses are grouping dimensions in the dataset 170, the dimension within the second parentheses is the numeric dimension in the dataset 170, and the analysis operation (i.e., the "Sum" operation) is within the third parentheses. This candidate combination defines such an analysis pattern that the sales (e.g., the dimension "Sales" in the dataset 170) are summated by the sales representative and by region (e.g., the dimensions "SalesRep" and "Region" in dataset 170). Similarly, the candidate assessment module 220 determines a metric corresponding to the following candidate combination "([Region], [ ]), ([Sales]) and ([SUM])", and the analysis pattern defined by this candidate combination is to sum the sales (e.g., the dimension "Sales" in the dataset 170) by region (e.g., the dimension "Region" in dataset 170). Metrics of other candidate combinations are also listed.

The metrics 224 of the plurality of candidate combinations determined by the candidate assessment module 220 are provided to the recommendation provision module 230. The recommendation provision module 230 provides a recommendation 180 on an analysis pattern(s) for the dataset based on the respective metrics 224 of the plurality of candidate combinations. The recommendation 180 indicates at least one of the plurality of candidate combinations. In some implementations, the recommendation provision module 230 may select one or more candidate combinations with higher metrics among all the plurality of candidate combinations for recommendation. In some implementations, a threshold metric may be set, and the candidate assessment module 220 may recommend one or more candidate combinations with metrics higher than the threshold metric.

In some implementations, one or more candidate combinations to be recommended by the recommendation provision module 230 may be presented to the user. Since candidate combinations defines analysis patterns for the dataset 170, by presenting the candidate combinations with a higher metrics to the user, the user may directly select a desired candidate combination to apply to the dataset 170. Such a recommendation may be provided in a user interface of a tool or application (such as a spreadsheet application) that can be used to edit and present a dataset or data table. In this way, after a user selection of a candidate combination is received, the defined analysis pattern is directly applied to the dataset 170, so that the analysis result can be presented on the corresponding user interface. In this way, the user may acquire a common analysis pattern for the dataset 170 and apply it quickly, without getting familiar with the analysis operations provided by the tool or application, and without paying tedious manual operations.

FIGS. 3A-3D illustrate example presentations of some candidate combinations determined by the candidate assessment module 220 and recommended by the recommendation provision module 230. In the examples of FIGS. 3A-3D, the candidate combinations are presented according to example analysis results after being applied to the dataset 170, where "Total" represents sums of data items in corresponding rows or columns, and "Average" represents averages of data items in corresponding rows or columns. In the presentation 310 of FIG. 3A, the candidate combination of ([SalesRep], [Region]), ([Sales]), and ([SUM]) is illustrated schematically, which visually shows a resulting pivot table and results of sums of the dimension "Sales" by the dimension "SalesRep" and the dimension "Region" to be included in the table. In the presentation 320 of FIG. 3B, the candidate combination of ([Region], [ ]), ([Sales]), and ([SUM]) is illustrated schematically, which visually shows a resulting column-wise data table and results of sums of the dimension "Sales" by the dimension "Region" to be included in the table. In the presentation 330 of FIG. 3C, the candidate combination of ([Date], [SalesRep]), ([Sales]), and ([AVERAGE]) is illustrated schematically, which visually shows a resulting pivot table and results of averaging the dimension "Sales" by the dimension "Date" and the dimension "SalesRep" to be included in the table. In the presentation 340 of FIG. 3D, the candidate combination of ([SalesRep], [ ]), ([Sales]), and ([SUM]) is illustrated schematically, which visually shows a resulting column-wise data table and results of sums of the dimension "Sales" by the dimension "SalesRep" to be included in the table. Such visual presentations can enable the user to quickly localize the analysis patterns through the schematic analysis results.

If the user selects a candidate combination, such as the candidate combination of ([SalesRep], [Region]), ([Sales]), and ([SUM]), the analysis pattern defined by that candidate combination may be applied to the dataset 170. The analysis pattern defined by the candidate combination of ([SalesRep], [Region]), ([Sales]), and ([SUM]) may, for example, be expressed as the following instruction: sum "Sales" by "SalesRep" and "Region", which indicates "sum Sales by Sales Representative and Region." Such an instruction may be provided to an editing tool of the dataset 170 to obtain the corresponding analysis result. The analysis result of the dataset 170 may also be presented. The analysis result may be presented in various forms, for example, in the form of a data table, a histogram, a curve, a pie chart, and the like. The user may specify a presentation manner of the analysis result, or a default presentation manner may be used or a suitable presentation mode may be determined based on the specific analysis result.

Figures 4A, 4B:
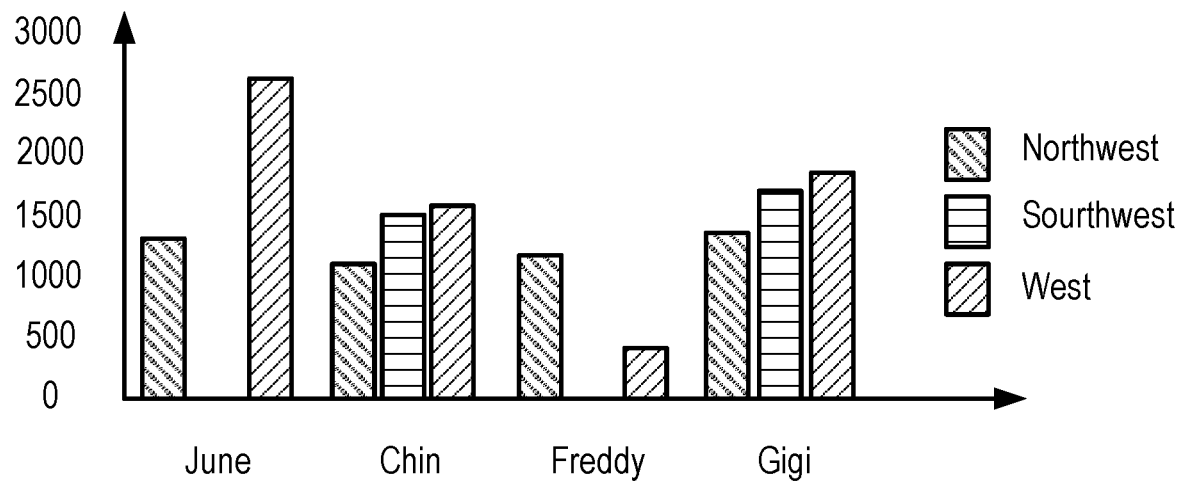
FIGS. 4A-4B illustrate schematic diagrams of example analysis results after performing analysis on the dataset in accordance with some implementations of the subject matter described herein.

FIGS. 4A-4B respectively illustrate analysis results after performing analysis on the dataset 170 according to analysis patterns selected by the user (i.e., "sum Sales by Sales Representative and Region"). FIG. 4A shows an analysis result 410 in the form of a data table, and FIG. 4B shows an analysis result in the form of a histogram. It is noted that FIG. 1 does not show all the data items IN the dataset 170, but the analysis results of FIG. 4A and FIG. 4B are obtained by analysis performed on all the data items of the dimensions in the dataset 170.

In some implementations, as mentioned above, one or more elements in the candidate combination to be assessed by the candidate assessment module 220 may be pre-specified. One possible scenario is that the user input an analysis request for the dataset 170. The candidate assessment module 220 may determine possible candidate combinations and assess these candidate combinations according to the dimensions of the dataset 170 and/or the analysis operation to be performed involved in the analysis request input by the user. The recommendation provision module 230 may further select and present one or more candidate combinations with higher metrics as a recommendation for the complete analysis request input by the user. This helps the user to localize and input a desired analysis request more quickly, thereby obtaining the analysis result more quickly.

FIGS. 5A-5B illustrate two examples related to the analysis request input by the user. In the example of FIG. 5A, no user input is received from an input box in a query interface 510. Recommendations on analysis patterns for the dataset 170 determined by the example analysis recommendation module 122 of the subject matter described herein may be provided as input recommendations to the user, as shown in FIG. 5A. In the example of FIG. 5B, in a query interface 520, a partial input of the user, e.g., "SUM," is received in the input box, and thus it may be determined that the analysis pattern to be applied by the user to the dataset 170 should include "SUM." The example analysis recommendation module 122 of the subject matter described herein may determine respective metrics of the plurality of candidate combinations including "SUM", and provide candidate combinations with a higher metrics as input recommendations to the user, as shown in FIG. 5B.

Automatic recommendation of analysis for the dataset has been discussed above. In the following, reference will be made to some examples to discuss in detail how the candidate assessment module specifically assesses the metrics of the candidate combinations so as to determine whether the candidate combinations are suitable for defining the analysis pattern for the dataset.

Example Implementations of Pipelined Candidate Assessment

In some implementations, the candidate assessment module 220 may assess the candidate combinations that can be formed from the plurality of dimensions 172 of the dataset 170 and the plurality of candidate analysis operations in a pipelined manner. Specifically, according to the pipelined manner, the candidate assessment module 220 may first assess whether the plurality of dimensions 172 of the dataset 170 are suitable for serving as grouping dimensions or numeric dimensions, including whether a single dimension is suitable for serving as a grouping dimension or numeric dimension in an analysis pattern, and whether two or more dimensions, combined together, are suitable for serving as a plurality of grouping dimensions or numeric dimensions in an analysis pattern. Then, the candidate assessment module 220 may filter out a plurality of candidate dimension combinations suitable for serving as the dimensions to be analyzed, where each candidate dimension combination includes at least one dimension 172 of the dataset 170. The candidate assessment module 220 may then combine the plurality of candidate dimension combinations with the plurality of candidate analysis operations according to form a plurality of candidate combinations to be assessed for defining analysis patterns. The candidate assessment module 220 may further calculate respective metrics of the plurality of candidate combinations.

In some implementations, in determining the candidate dimension combinations, the candidate assessment module 220 may also determine grouping dimension candidates that may be used as grouping dimensions and numeric dimension candidates that may be used as numeric dimensions in a parallel manner from the plurality of dimensions 172 of the dataset 170, and then determine candidate dimension combinations from various combinations of the grouping dimension candidates and the numeric dimension candidates.

Figure 6:
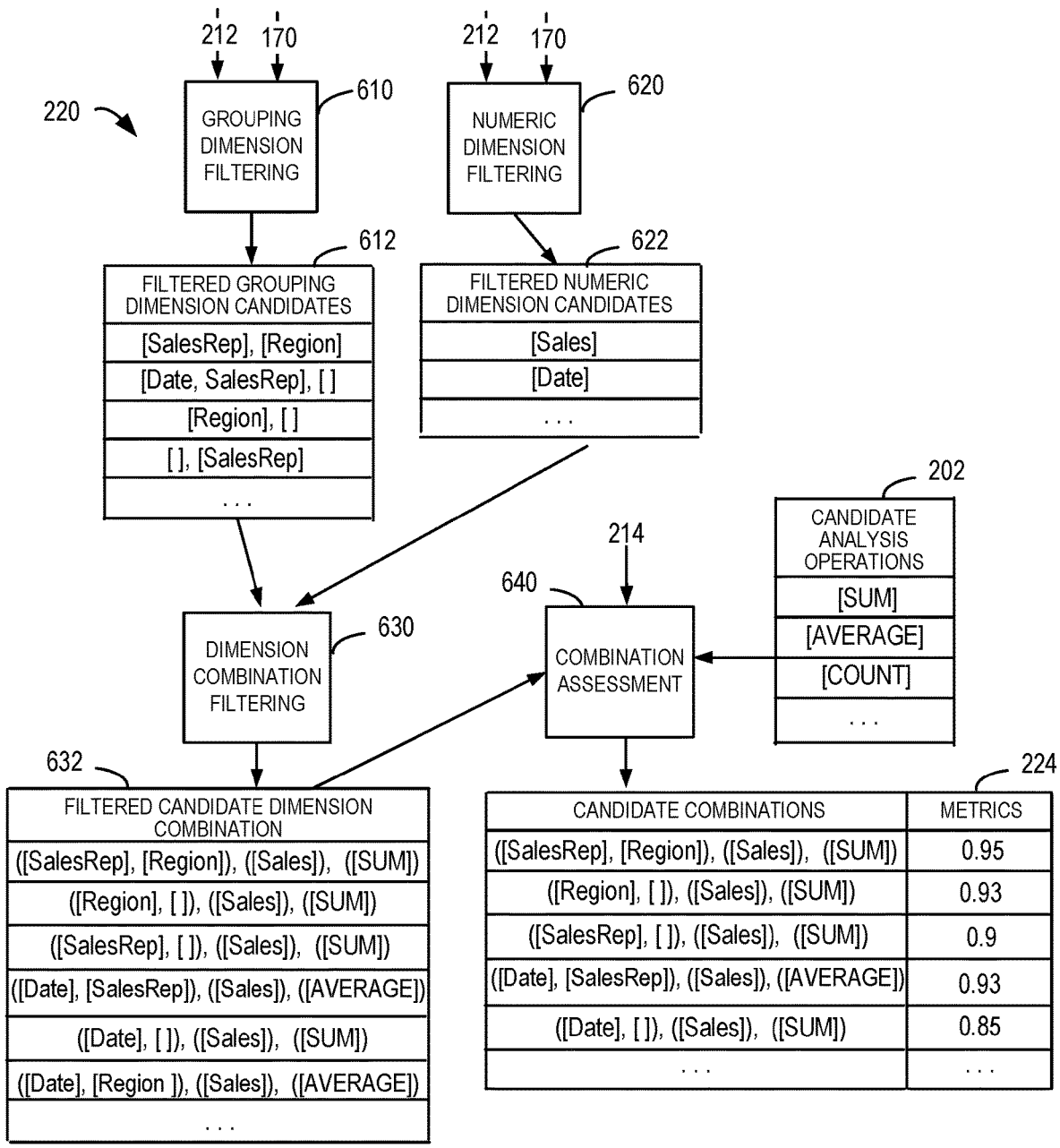
FIG. 6 illustrates an example block diagram of the candidate assessment module of FIG. 2 in accordance with an implementation of the subject matter described herein.

FIG. 6 illustrates example architecture of the candidate assessment module 220 according to an example implementation of pipelined candidate assessment. In the example implementation of FIG. 6, the candidate assessment module 220 includes a grouping dimension filtering module 610, a numeric dimension filtering module 620, a dimension combination filtering module 630, and a combination assessment module 640. The grouping dimension filtering module 610 and the numeric dimension filtering module 620 are used to determine, from the respective dimensions 172 of the dataset 170, which dimensions are adapted to serve as the grouping dimensions or numeric dimensions, respectively, in the analysis pattern based on the dimension feature information 212. The dimension combination filtering module 630 further determines candidate dimension combinations based on the filtered results from the grouping dimension filtering module 610 and the numeric dimension filtering module 620. Each candidate dimension combination includes at least one dimension 172 in the dataset 170 which is determined by the grouping dimension filtering module 610 and/or the numeric dimension filtering module 620 as the grouping dimension(s) and/or numeric dimension(s). Then, the candidate dimension combinations are provided to the combination assessment module 640 to combine with the candidate analysis operation 202 to assess the respective metrics of the candidate combinations.

In some implementations, one or more of the grouping dimension filtering module 610, the numeric dimension filtering module 620, the dimension combination filtering module 630, and the combination assessment module 640 may use a machine learning model to implement their functionalities. A machine learning model used by each module can be pre-trained to provide an expected output result of this module based on the input feature information. Since the functions to be implemented by the grouping dimension filtering module 610, the numeric dimension filtering module 620, the dimension combination filtering module 630, and the combination assessment module 640 are different, the feature information to be taken into account by the machine learning model utilized by each module is also different.

In some implementations, the machine learning model(s) to be utilized by the grouping dimension filtering module 610, the numeric dimension filtering module 620, the dimension combination filtering module 630, and/or the combination assessment module 640 may be a decision tree-based model. In some examples, the decision tree-based model may be a Random Forest (RF) model. The RF model refers to a classifier with a plurality of decision trees trained on training samples and capable of performing prediction. The RF model can provide a corresponding confidence or matric of an input being divided into each of the categories. The RF model may be trained in a supervised or unsupervised manner. Different decision tree-based models may be trained to implement the corresponding functions of the grouping dimension filtering module 610, the numeric dimension filtering module 620, the dimension combination filtering module 630, and/or the combination assessment module 640. The specific work principle of the RF model is well known to those skilled in the art and will not be described in detail here.

In some implementations, other examples of the machine learning model to be utilized by the grouping dimension filtering module 610, the numeric dimension filtering module 620, the dimension combination filtering module 630, and/or the combination assessment module 640 may include, for example, a support vector machine (SVM), XGBoost model, neural network, and any other machine learning model suitable for determining metrics for classification or regression based on vectorized feature information. It would be appreciated that any improvement to the machine learning model, either currently developed or developed in the future, may be accordingly applied to the example implementations of the subject matter described herein.

Detailed descriptions of the respective modules in the example candidate assessment module 220 of FIG. 6 will be provided in the following. The grouping dimension filtering module 610 determines, from the plurality of dimensions 172 in the dataset 170 and their dimension feature information 212, one or more dimensions suitable for serving as a grouping dimension(s) as a grouping dimension candidate(s) 612. As an analysis pattern of the dataset may be defined by one or more grouping dimensions, each grouping dimension candidate 612 may include one or more dimensions of the dataset 170. The grouping dimension filtering module 610 may explore various possible combinations of the dimensions 172 to find the grouping dimension candidates (each including one or more dimensions 172), and determine respective metrics (sometimes also referred to as "first metrics" for differentiation purpose herein) of the grouping dimension candidates suitable for serving as grouping dimensions in analysis patterns.

For each grouping dimension candidate, the grouping dimension filtering module 610 may determine a metric of the grouping dimension candidate based on a feature information portion of the dimension feature information 212 that corresponds to one or more dimensions 172 involved in this grouping dimension candidate. The feature information portion may include a semantic feature representation of a dimension name of an involved dimension 172 and a data distribution feature representation of data items included in the dimension 172. If the grouping dimension candidate involves a plurality of dimensions 172, the semantic feature representations of the dimension names and the data distribution feature representations of the plurality of dimensions 172 may be averaged or concatenated. If the grouping dimension candidate involves a plurality of dimensions 172, the data distribution feature representations may also characterize some features across the plurality of dimensions 172, such as the similarity, mutual information and the like across the dimensions 172. In the implementation where a RF model is used, feature information portions of individual dimensions 172 involved in the grouping dimension candidate are used as inputs to the RF model. The RF model may determine, based on the inputs, the metric of the grouping dimension candidate being suitable for serving a grouping dimension(s) in an analysis pattern.

For a plurality of possible grouping dimension candidates, the grouping dimension filtering module 610 may determine their respective metrics. The grouping dimension filtering module 610 may select, based on the respective metrics of the grouping dimension candidates, some grouping dimension candidates 612 with relatively higher metrics and provide the selected ones to the dimension combination filtering module 630 to determine the dimension combinations. In some implementations, the grouping dimension filtering module 610 may sort the grouping dimension candidates by their metrics, and then filter a predetermined number of grouping dimension candidates 612 with higher metrics from all the grouping dimension candidates. Alternatively, the grouping dimension filtering module 610 may also select, from the sorted grouping dimension candidates, one or more grouping dimension candidates 612 with their metrics higher than a certain threshold metric and provide the selected ones to the dimension combination filtering module 630. FIG. 6 shows an example list of filtered grouping dimension candidates 612 for the example dataset 170 of FIG. 1.

In some implementations, as the number of grouping dimensions in the analysis pattern is not fixed (may be one or more), it may need to explore all possible combinations of the plurality of dimensions 172, resulting in a larger number of grouping dimension candidates to be assessed. In order to improve the efficiency, heuristic beam searching may be employed to determine the respective first metrics of the plurality of grouping dimension candidates being suitable for serving as grouping dimensions.

In some implementations, for a grouping dimension candidate including a plurality of dimensions, it also may need to consider a corresponding analysis role of each of the dimensions in the analysis pattern. For example, setting a grouping dimension as different analysis roles in different analysis patterns may cause different presentations of the final analysis result. Usually, to generate a pivot table, an analysis role of a grouping dimension may be explicitly defined, for example, as column-wise data of the pivot table (which means that the dimension name is used as a column header) or row-wise data of the pivot table (which means that the dimension name is used as a row header, see the example shown in FIG. 4A). Of course, in the cases where other types of analysis results are generated, such as histograms or curve graphs equivalent to the pivot table are generated, the analysis role of the grouping dimension may be defined as providing variables in a horizontal-axis direction or variables in a vertical-axis direction of the histogram or curve graph (see the example of FIG. 4B). In the assessment phase, the grouping dimension filtering module 610 may consider the numbers of grouping dimensions corresponding to different analysis roles.

Figure 7:
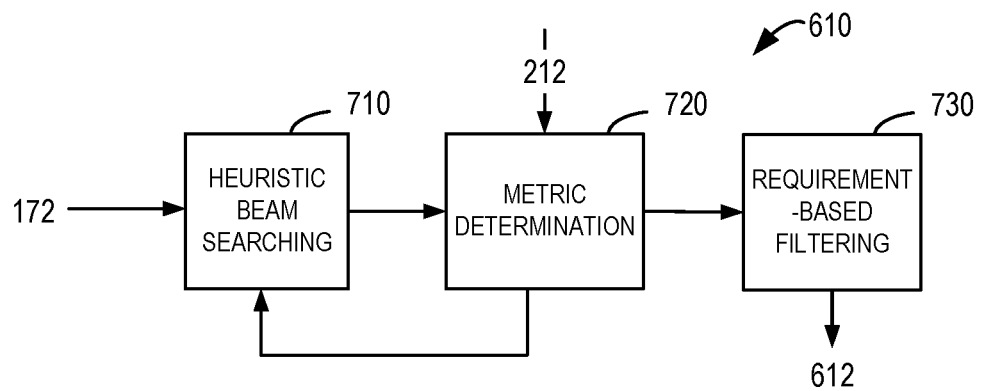
FIG. 7 illustrates an example block diagram of the grouping dimension filtering module of FIG. 6 in accordance with an implementation of the subject matter described herein.
Figure 8:
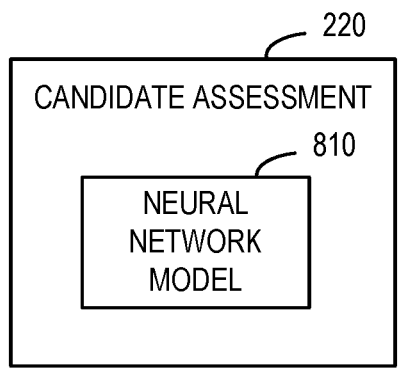
FIG. 8 illustrates an example block diagram of the candidate assessment module of FIG. 2 according to another implementation of the subject matter described herein.

FIG. 7 shows a block diagram of an example of the grouping dimension filtering module 610. As shown in FIG. 7, the grouping dimension filtering module 610 includes a heuristic beam searching module 710, a metric determination module 720, and a requirement-based filtering module 730. The metric determination module 720 may determine a respective metric of each grouping dimension candidate using a RF model.

The heuristic beam searching module 710 is configured to cooperate with the metric determination module 720 by means of heuristic beam searching so as to quickly determine grouping dimension candidates. The heuristic beam searching is a heuristic graph search algorithm which usually used in the case that a solution space of a graph is large. In order to reduce the space and time consumption by the search, at each step of search, some poor-quality solutions are pruned and only some (for example, a predetermined number of) higher-quality solutions are retained. The next round of search continues to expand based on the retained solutions. This reduces space consumption and improves time efficiency. In the example of grouping dimension filtering, the solution spaces include possible combinations (i.e., possible grouping dimension candidates) of the plurality of dimensions 172 of the dataset 170. The "quality" of a solution refers to the metric determined by the metric determination module 720.

The heuristic beam searching module 710 may perform multiple rounds of search within the solution space. The initial search starts from a single dimension of the plurality of dimensions 172. Each dimension combination determined by the heuristic beam searching module 710 is provided to the metric determination module 720 to determine the corresponding metric. Some dimension combinations with relatively higher metrics in each round are provided to the heuristic beam searching module 710 for the next round of search. Finally, the metric determination module 720 filters, based on the determined metrics of all the dimension combinations, some grouping dimension candidates (for example, a first predetermined number of grouping dimension candidates) with higher metrics. Each grouping dimension candidate includes one or more dimensions 172.

The requirement-based filtering module 730 may use a grouping dimension requirement associated with the analysis patterns to select a grouping dimension candidate that meets the grouping dimension requirement from the grouping dimension candidates filtered by the metric determination module 720. The grouping dimension requirement indicates the number of grouping dimensions needed by each analysis role in the analysis operation. In an example where two analysis roles of "column-wise data" and "row-wise data" are needed, a grouping dimension requirement indicates the number of dimensions required for the "column-wise data" and the number of dimensions required for the "row-wise data." There may be a plurality of analysis dimension requirements. These analysis dimension requirements may, for example, be obtained by determining, from existing data tables, common requirements for the column-wise number of dimensions and the row-wise number of dimensions. For example, a plurality of grouping dimension requirements may be determined as follows: (2 columns, 1 row), (2 columns, 0 rows), (1 column, 1 row), and so on, each indicating a requirement for the numbers of columns and rows. For each grouping dimension requirement to be considered, the requirement-based filtering module 730 may determine, from the plurality of grouping dimension candidates provided by the metric determination module 720, a grouping dimension candidate that meets the requirement for the row-wise number and a grouping dimension candidate that meets the requirement for the column-wise number, and then combine the two grouping dimension candidates as a filtered grouping dimension candidate 612.

Referring back to FIG. 6, based on the dimension feature information 212 of the plurality of dimensions 172 of the dataset 170, the numeric dimension filtering module 620 determines, from the plurality of dimensions 712, one or more dimensions suitable for serving as the numeric dimensions as a numeric dimension candidate 622. In some implementations, the number of numeric dimensions in an analysis pattern may be specified, for example, as one. In this way, the numeric dimension filtering module 620 may respectively assess a metric (sometimes referred to as a "second metric" for the purpose of differentiation herein) of an individual dimension 172 of the dataset 170 being suitable for serving as the numeric dimension candidate. In some implementations, the number of numeric dimensions in the analysis pattern may not be deterministic. In such a case, to determine the possible grouping dimension candidates, the numeric dimension filtering module 620 may also need to explore various combinations of the plurality of dimensions 172 of the dataset 170 so as to determine respective metrics of these combinations serving as numeric dimension candidates. In such an implementation, in order to achieve fast search, the heuristic beam searching can be applied as in the grouping dimension filtering.

For each numeric dimension candidate, the numeric dimension filtering module 620 may determine a metric of the numeric dimension candidate based on a feature information portion of the dimension feature information 212 that corresponds to one or more dimensions 172 involved in this numeric dimension candidate. The feature information portion may include a semantic feature representation of a dimension name of an involved dimension 172, and a data distribution feature representation of data items included in the dimension 172. If the numeric dimension candidate involves a plurality of dimensions 172, the semantic feature representations of the dimension names and the data distribution feature representations of the plurality of dimensions 172 may be averaged or concatenated. If the numeric dimension candidate involves a plurality of dimensions 172, the data distribution feature representations may also characterize some features across the plurality of dimensions 172, such as the similarity, mutual information and the like across the dimensions. In the implementation where a RF model is used, feature information portions of individual dimensions 172 involved in the numeric dimension candidate are used as inputs to the RF model. The RF model may determine, based on the inputs, the metrics of the numeric dimension candidate being suitable for serving as a numeric dimension(s) in an analysis pattern.

For a plurality of possible numeric dimension candidates, the numeric dimension filtering module 620 may determine their respective metrics. The numeric dimension filtering module 620 may select, based on the respective metrics of the numeric dimension candidates, some numeric dimension candidates 622 with relatively higher metric candidates and provide the selected ones to the dimension combination filtering module 630 to determine the dimension combinations. In some implementations, the numeric dimension filtering module 620 may sort the numeric dimension candidates by their metrics, and then filter a predetermined number (sometimes referred to as "a second predetermined number" for the purpose of differentiation herein) of numeric dimension candidates 622 with higher metrics from all the numeric dimension candidates. Alternatively, the numeric dimension filtering module 620 may also select, from the sorted numeric dimension candidates, one or more numeric dimension candidates 622 with their metrics higher than a certain threshold metric and provide the selected ones to the dimension combination filtering module 630. FIG. 6 shows an example list of filtered numeric dimension candidates 622 for the example dataset 170 of FIG. 1.

Still referring to FIG. 6, the filtered grouping dimension candidate 612 and the numeric dimension candidate 622 are provided to the dimension combination filtering module 630. The dimension combination filtering module 630 assesses a plurality of candidate dimension combinations constructed from the grouping dimension candidates 612 and the numeric dimension candidates 622, to determine respective dimension combination metrics of the candidate dimension combinations being suitable for defining at least one dimension to be analyzed in an analysis pattern for the dataset 170. Each candidate dimension combination includes a grouping dimension candidate 612 and/or a numeric dimension candidate 622. The dimension combination filtering module 630 may enumerate a number of possible combinations of the filtered grouping dimension candidate 612 and the filtered numeric dimension candidate 622.

The dimension combination filtering module 630 may also determine the respective dimension combination metrics of the candidate dimension combinations using a RF model. In the implementation of using the RF model, the feature information portion of each dimension 172 involved in a candidate dimension combination is used as an input to the RF model. The RF model may determine, based on its inputs, the dimension combination metric of the candidate dimension combination being suitable for serving as the grouping dimension(s) and numeric dimension(s) in an analysis pattern.

After determining the respective dimension combination metrics of all the dimension combinations, the dimension combination filtering module 630 may select, based on the dimension combination metrics, one or more candidate dimension combinations with relatively higher metrics from the plurality of candidate dimension combinations, and combine the selected ones with the plurality of candidate analysis operations 202 together to form candidate combinations for defining analysis patterns. In some implementations, the dimension combination filtering module 630 may sort the candidate dimension candidates by their dimension combination metrics, and then filter a predetermined number of candidate dimension combinations 632 with higher metrics from all the candidate dimension combinations. Alternatively, the dimension combination filtering module 630 may also select, from the sorted candidate dimension combinations, one or more candidate dimension combinations 622 with their metrics higher than a certain threshold metric and provide the selected ones to the combination assessment module 640. FIG. 6 shows an example list of the filtered candidate dimension combinations 632 for the example dataset 170 of FIG. 1.

The combination assessment module 640 is configured to enumerate a plurality of candidate combinations constructed from the candidate dimension combinations 632 and the candidate analysis operations 202, each candidate combination including one candidate dimension combination and one or more candidate analysis operations 202. The combination assessment module 640 may further assess each candidate combination and determine a corresponding metric 224 of each candidate combination being suitable for defining an analysis pattern for the dataset 170. The combination assessment module 640 may determine a corresponding metric based on the operation feature information 214 and the dimensional feature information 212. For a given candidate combination, the combination assessment module 640 may determine the metric using the feature information portion of the operation feature information 214 corresponding to the candidate analysis operation(s) in the candidate combination and the feature information portion of the dimension feature information 212 corresponding to the dimension(s) in the candidate combination. Metrics may also be determined with the help of the RF model. The corresponding feature information portion may be taken as an input of the RF model to determine the metric of the candidate combination. In some implementations, for each candidate combination, the combination assessment module 640 may combine the corresponding dimension combination metric of the candidate dimension combination determined by the dimension combination filtering module 630 with the corresponding metric of the candidate combination determined by the combination assessment module 640 (e.g., a product of the two metrics), to determine a final metric 224 of the candidate combination.

Example Implementations of Candidate Assessment Based on Analysis Language

In some implementations of the subject matter described herein, an analysis language is predefined. The analysis pattern of the dataset 170 may be represented in such a way that it may include predetermined symbols (similar to a "vocabulary" in a natural language) and predetermined rules for arrangement of these symbols (similar to "grammar rules" in a natural language). The predetermined symbols may also be referred to as tokens. After one or more symbols are combined into a sequence according to the predetermined rules, the sequence may represent an analysis pattern. Such an analysis language may sometimes be considered as a domain-specific language or a programming language. By defining such an analysis language, a neural network model for natural language processing or programing language processing may be employed to perform the candidate assessment. Currently various neural network models have been designed for tasks for natural language processing, and these models can also be applied to tasks for programming language processing of a computer after certain variations. In addition, there are some neural network models that are specifically designed to handle tasks in a programming language. These models are all applied in the embodiments in the subject matter as described herein.

Figure 9:
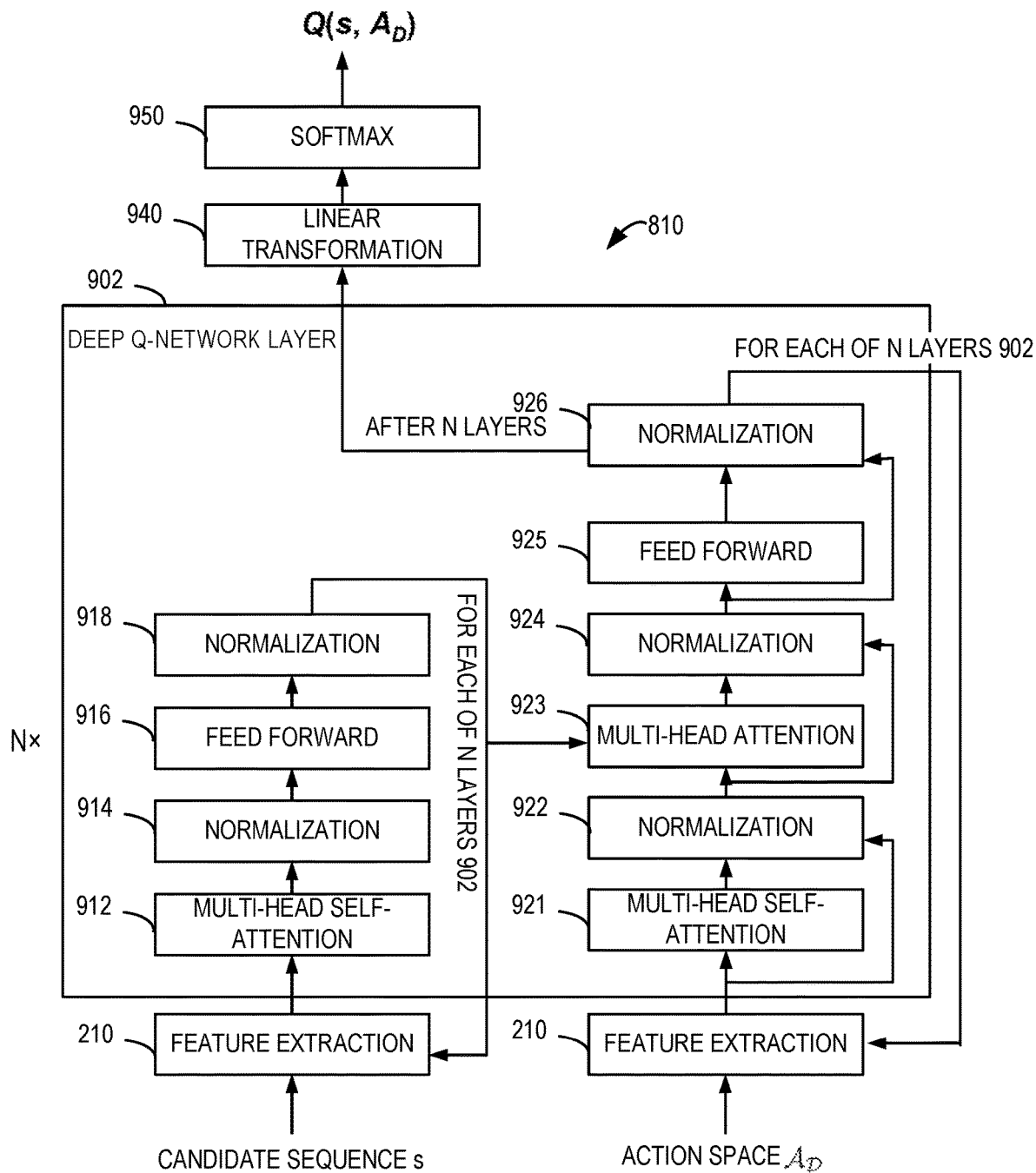
FIG. 9 illustrates an example block diagram of the neural network model of FIG. 8 in accordance with an implementation of the subject matter described herein.

FIG. 9 shows an example of the candidate assessment module 220 in such an implementation. As shown in FIG. 9, the candidate assessment module 220 uses a neural network model 810 to implement the candidate assessment. The neural network model 810 may be any model suitable for natural language or programming language processing.

A set of predetermined symbols in the defined analysis language may include candidate indicators indicating respective dimensions of a dataset, candidate indicators indicating a plurality of candidate analysis operations, and a separator. In such a way, for different datasets 170, the candidate indicators of the predetermined symbols for indicating the dimensions 172 may be different, and the plurality of applicable candidate analysis operations 202 may also be different, which means that the candidate indicators indicating the candidate analysis operations are also different. In some implementations, the dimension names of the dimensions 172 and the operation names of the candidate analysis operations 202 may be determined as the candidate indicators of the predetermined symbols. The separator may be defined using a predetermined symbol, for example, may be represented as [SEP]. The separator is used in a sequence to separate grouping dimensions that indicate different analysis roles in an analysis operation. In some implementations, the predetermined symbols further include a start symbol indicating a start of the sequence, which may, for example, be represented as [ANA]. By performing selection from the predetermined symbols, a sequence formed with the selected symbols may be used to define an analysis pattern.

The predetermined rule of the defined analysis language may define a relative location relationship of predetermined symbols corresponding to the dimensions to be analyzed (such as grouping dimensions and/or numeric dimensions) and the analysis operation of the analysis pattern within a sequence. For example, the corresponding predetermined symbols may be arranged in an order of "numeric dimension, grouping dimension, and analysis operation." In other examples, other arrangement orders of the three components of the analysis pattern may also be specified, and the implementations of the subject matter as described herein are not limited in this regard. In the case where an analysis pattern may be defined with a plurality of grouping dimensions, the predetermined rule of the defined analysis language may also specify that different analysis roles in an analysis operation are separated by an separator (for example, [SEP]) in a sequence. In some implementations, if an analysis pattern includes both a grouping dimension(s) and a numeric dimension(s), it may be specified that the separator is used to separate the grouping dimension(s) and the numeric dimension(s). Alternatively, or in addition, it may be specified that the separator is used to separate the dimensions to be analyzed (i.e., the grouping dimensions and/or the numerical dimensions) from the analysis operation in the analysis pattern.

The predetermined rule of the defined analysis language may further specify that each candidate indicator (corresponding to a dimension or an analysis operation) of the plurality of candidate indicators is not repeated in each sequence. In actual applications, the same dimension may not be served as both a grouping dimension and a numeric dimension or an analysis procedure may not be applied twice during one analysis procedure. For example, the analysis result obtained by repeatedly performing an analysis operation on the same numeric dimension may be meaningless, or no meaningful analysis result can be obtained by applying an analysis operation to the same dimension for many times.

According to the above predetermined rule, an analysis pattern for a dataset may be represented by a sequence of symbols. For example, for an analysis pattern of "SUM 'Sales' by 'SalesRep' and 'Region', an analysis sequence may be represented using the analysis language as, for example, "[ANA] [Sales] [SEP] [SalesRep] [SEP] [Regions] [SUM]". It would be appreciated that in addition to being represented in a sequence based on the predetermined symbols in the analysis language, when performing the analysis, a set of predetermined symbols corresponding to the analysis pattern may also be represented in other structures, such as a tree structure. The tree structure and the sequence of symbols for the same analysis pattern may be interchanged with each other. For convenience of illustration, a set of symbols corresponding to an analysis pattern is herein mainly represented in form of sequence.

The dataset 170 to be analyzed is represented as $\mathcal{D}$, which includes n dimensions. The set of n dimensions is represented as $\mathcal{F}_\mathcal{D} = (f_1^\mathcal{D}, \ldots, f_n^\mathcal{D})$, i.e., for each dimension 172, $f \in \mathcal{F}_\mathcal{D}$. A set of predetermined symbols for the dataset 170 is represented as $\mathcal{A}_\mathcal{D}$, and each predetermined symbol $a \in \mathcal{A}_\mathcal{D}$ in the analysis sequence may be one of the following three types of symbols: a candidate indicator $f \in \mathcal{F}_\mathcal{D}$ corresponding to a dimension 172, a candidate indicator corresponding to a candidate analysis operation 202 selected from $\mathcal{G} = \{[\text{Sum}], [\text{Count}], [\text{Average}], \ldots\}$; a symbol indicating a change in type, that is, a separator and a start symbol, $\varepsilon = \{[\text{ANA}], [\text{SEP}]\}$, where [ANA] indicates the start symbol and [SEP] indicates the separator. Therefore, if the defined analysis language is represented in the Backus-Naur form, it may be represented as: <analysis sequence>|=[ANA] [dimension] [SEP]<grouping dimension(s)> <analysis operation> <grouping dimension(s)>|=<dimension(s)>|<dimension(s)>[SEP]<grouping dimension(s)> <dimension(s)>|=λ|<dimension> <dimension(s)> <dimension>|=a dimension from $\mathcal{F}_\mathcal{D}$ <Analysis operation>|=candidate analysis operation from $\mathcal{G}$ In <grouping dimension(s)>, the number of dimensions separated by [SEP] may be varied depending on the analysis type. For example, if an analysis is to be performed to produce a pivot table and the grouping dimensions in the analysis operation may have two analysis roles, the separator [SEP] is used to separate the two analysis roles. In some implementations, if one numeric dimension is determined, the separator between the numeric dimension and the grouping dimension(s) may be omitted. In this case, the candidate indicator after the start symbol [ANA] in the analysis sequence is determined by default to indicate the numeric dimension and one or more indicators following the indicator of the numeric dimension are determined to indicate the grouping dimension(s).

After the symbols and rules of the analysis language are defined, to assess the plurality of candidate combinations of the dimensions 172 of the dataset 170 and the candidate analysis operations 202, a natural language processing model suitable for sequence analysis may be used as a neural network model 810. The neural network model 810 may generate and assess whether a target analysis sequence(s) is suitable for defining an analysis pattern(s) and determine a corresponding sequence metric(s). A target analysis sequence may include indicators corresponding to the dimensions 172 and the candidate analysis operations 202, and possibly the separator [SEP] and the start symbol [ANA]. In some examples, the separator [SEP] may be repeated for one or more times, which means that a target analysis sequence may include a plurality of occurrences of the separator [SEP]. The separator [SEP] is used to separate some candidate indicators in a target analysis sequence.

Generally, the number of such target analysis sequences is also very large because the number of possible sequences formed from the dimensions 172, candidate analysis operations and separators is very large. The task of the neural network model 810 is to filter and determine, from all the possible sequences, a sequence(s) that can be truly used to define an analysis pattern(s) for the dataset 170.

To facilitate understanding, definitions for some sequences formed from the symbols and rules of the analysis language are introduced first. If an analysis sequence $s \in \bigcup_{t=1}^{\infty} \mathcal{A}_\mathcal{D}^t$ follows the grammars of the defined analysis language (i.e., the rules mentioned above), the analysis sequence may be complete and thus may be referred to as a complete analysis sequence. A complete analysis sequence may completely define all the components in an analysis pattern. For a given dataset 170, a set of all possible complete analysis sequences is represented as $\mathcal{C}_\mathcal{D}$, and a set of all the prefixes of all the analysis sequences in the set $\mathcal{C}_\mathcal{D}$ is represented as $\mathcal{S}_\mathcal{D}^+$. Therefore, the sequences in the set $\mathcal{S}_\mathcal{D} = \mathcal{S}_\mathcal{D}^+ \setminus \mathcal{C}_\mathcal{D}$ are referred to as a set of partial analysis sequences, which indicates a part of the set of prefixes with the complete analysis sequences $\mathcal{C}_\mathcal{D}$ removed therefrom.

In addition, an analysis sequence corresponding to an analysis pattern that the user would actually create or use is referred to as a target analysis sequence, and a set of target analysis sequences (represented as $\mathcal{G}_\mathcal{D}$) belongs to a part or all of the complete analysis sequence, i.e., $\mathcal{G}_\mathcal{D} \subseteq \mathcal{C}_\mathcal{D}$. If $\mathcal{T}_\mathcal{D}^+$ represents a set of all the prefixes of all the target analysis sequences in the set $\mathcal{G}_\mathcal{D}$, then the sequences in the set $\mathcal{T}_\mathcal{D} = \mathcal{T}_\mathcal{D}^+ \setminus \mathcal{G}_\mathcal{D}$ are referred to as target analysis sequences, which refers to a part of the set of prefixes with the set of target analysis sequences $\mathcal{G}_\mathcal{D}$ removed therefrom.

It is noted that the number of sequences in the set $\mathcal{S}_\mathcal{D}^+$ exponentially increases compared with the set $\mathcal{F}_\mathcal{D}$ of dimensions in the dataset since as the number of dimensions grows, the number of possible combinations of dimensions may explode.

With the definitions for the sets of sequences are given above, the task of assessing the candidate combinations of the dimensions 172 and the candidate analysis operations 202 may be converted into a language modeling task. If the components of the candidate combinations are not specified in advance, the modeling task of the neural network model 810 in the candidate assessment module 220 is defined as follows: given the dataset $\mathcal{D}$ 170, assessing the metrics of the complete analysis sequence (s∈ $\mathcal{G}_\mathcal{D}$ |$\mathcal{D}$ ) are assessed to filter out one or more complete analysis sequences ($s_1$; ..., $s_k$, i.e., k analysis sequences) with higher matrices. If partial components of the candidate combinations are specified in advance, the modeling task of the neural network model 810 in the candidate assessment module 220 is defined as follows: given a partial analysis sequence (which includes candidate indicators corresponding to the specified components) s∈ $\mathcal{S}_\mathcal{D}$ and possibly the next predetermined symbol a∈ $\mathcal{A}_\mathcal{D}$, assessing a possibility (i.e., matric) of a sequence formed by sa being used to define an analysis pattern (e.g., a possibility of the sequence sa is a prefix of a complete analysis sequence).

In operation, the candidate analysis module 220 obtains a set of predetermined symbols associated with the dataset 170, including candidate indicators indicating the plurality of dimensions 172 of the dataset 170 and the plurality of candidate analysis operations 202 that may be applicable to the dataset 170, and other predetermined symbols (e.g., the separator and the start symbol). The neural network model 810 may determine, according to a predetermined rule, respective sequence metrics of the target analysis sequences formed by symbol from the set of predetermined symbols. A target analysis sequence here is a complete analysis sequence.

In determining the metric of a complete analysis sequence, it is possible to start from an initial sequence including the start symbol, and iteratively select one or more symbols from the predetermined symbols to construct possible candidate sequences, where the constructing of the candidate sequences follow one or more predetermined rules of the analysis language. The neural network model 810 is used to determine corresponding candidate sequence metrics of the constructed candidate sequences based on feature information portions of the dimension feature information and of the operation feature information that correspond to the predetermined symbols in the candidate sequences. The neural network model 810 also determines whether a candidate sequence with a relatively higher metric can completely define an analysis pattern (that is, whether the current candidate sequence is a target analysis sequence). If the candidate sequence can completely define an analysis pattern, it may be output as a target analysis sequence; otherwise, it may be further attached with one or more predetermined symbols to generate new candidate sequences, and then the determination continues.

To implement the step-by-step iterative assessment, in an implementation, a Markov Decision Process (MDP) may be used to assess the candidate sequences generated symbol by symbol, thereby determining the target analysis sequences that can completely define the analysis patterns and their respective sequence metrics. MPD is defined by a 5-tuple, including a finite state set or a state space (corresponding to $\mathcal{S}_\mathcal{D}^+$ in the sequence assessment task), a finite action set or an action space (corresponding to $\mathcal{A}_\mathcal{D}$ in the task), state transition probability, a reward function, and a discount rate.

The state space $\mathcal{S}_\mathcal{D}^+$ may be represented as a tree with the start symbol [ANA] as a root node (which may correspond to an initial sequence). Thus, in the MDP, a sequence including the start symbol [ANA] is regarded as an initial state. In the action space, legal actions for a state s (corresponding to a candidate sequence, which is regarded as a "state" in MDP) is selected from $\mathcal{A}_\mathcal{D}$ (s)={a|sa∈ $\mathcal{S}_\mathcal{D}^+$ , ∀a∈ $\mathcal{A}_\mathcal{D}$ }, and thus the action space includes a set of predetermined symbols related to the current dataset. The state transition is deterministic and thus if an action a∈ $\mathcal{A}_\mathcal{D}$ (s) is selected, the state transition probability (represented as $\mathcal{P}_\mathcal{D}$ (s, a, s') from the state s to a state s' (the updated sequence) may be determined as:

$$\mathcal{P}_\mathcal{D}(s, a, s') = \begin{cases} 1 & \text{if } s' = sa, \\ 0 & \text{otherwise} \end{cases} \quad (1)$$

The reward function (represented as $\mathcal{R}_\mathcal{D}$ ) is used to reflect whether a candidate sequence can be successfully defined as a target analysis sequence. The reward function may be determined as follows:

$$\mathcal{R}_\mathcal{D}(s, a, s') = \begin{cases} 1 & \text{if } s' = sa \text{ and } s' \in \mathcal{G}_\mathcal{D}, \\ 0 & \text{otherwise} \end{cases} \quad (2)$$

Regarding the discount rate (represented as γ), if the length of the current candidate sequence has no impact on the result of the reward function, the discount rate γ=1.

The above MDP process can be optimized with an optimization function, to generate a solution. In some implementations, a final action-value function may be determined according to the Bellman optimality equation, and represented as:

$$q*(s, a) = \mathcal{R}_\mathcal{D}(s, a, sa) + \gamma \max_{a' \in \mathcal{A}_\mathcal{D}(sa)} q*(sa, a') = \begin{cases} 1 & \text{if } s' = sa \text{ and } s' \in \mathcal{T}_\mathcal{D}^+, \\ 0 & \text{otherwise} \end{cases} \quad (3)$$

In other words, if sa is a prefix of a target analysis sequence, $q_*(s, a)$ is equal to 1. Therefore, a learning objective of the above problem to be solved is $q_*(s, a)$ to determine the metric of the target analysis sequence (i.e., $\mathcal{P}$ (sa∈ $\mathcal{T}_\mathcal{D}^+$ |s, $\mathcal{D}$ )). By optimizing the action-value function associated with the transition from the current state s to the transition state s'(s'=sa), a corresponding candidate sequence matric of the candidate sequence being suitable for at least partially defining an analysis pattern may be determined, which may be in turn used to determine a matric of the target analysis sequence.

In some cases, an association between the action-value function and the language model of the next symbol may be found. For example, the neural network model 810, as a type of deep neural network (DNN), may be taken as an approximator for $q^*(s, a)$ and used to determine $q^*(s, a)$. The neural network model 810 is capable of learning the association between the input and the output from a large amount of obtained data. In addition, since the length of a target analysis sequence to be determined is dynamic, the DNN structure may be capable of handling the varying input lengths. In addition, the neural network model of DNN is also suitable for effectively processing feature information related to semantics.

In some implementations, the neural network model 810 may be implemented based on a deep learning algorithm and may be constructed as a deep Q-network, represented as $Q$ (s, $\mathcal{A}_\mathcal{D}$ ), where the state s represents a previously-determined sequence, and $\mathcal{A}_\mathcal{D}$ is a set of predetermined symbols. Both the states s and $\mathcal{A}_\mathcal{D}$ are taken as inputs to the neural network model 810. The neural network model 810 may then take the current state s as the initial sequence, select, from $\mathcal{A}_\mathcal{D}$, a predetermined symbol a (i.e., a∈$\mathcal{A}_\mathcal{D}$) as the candidate sequence, and assess the corresponding sequence metric of the candidate sequence sa (which may, for example, be valued from 0 to 1). The selection of the predetermined symbol a follows the predetermined rules of the analysis language, and invalid candidate sequences falling into $\mathcal{A}_\mathcal{D} \setminus \mathcal{A}_\mathcal{D}$ (s) may not be considered.

FIG. 9 illustrates an example implementation of the neural network model 810. It would be appreciated that the structure shown in FIG. 9 is only a specific example, and other neural network models are also possible.

The example of FIG. 9 implements an encoder-decoder converter, which performs well on sequence tasks in natural language processing, especially a converter structure based on layer-wise connections. As shown in FIG. 9, the neural network model 810 includes N deep Q-network layers 902 which are layer-wise connected. Each network layer 902 has an encoder-decoder structure. In the encoder section, each network layer 902 includes a multi-head self-attention layer 912, a regularization layer 914, a feed forward layer 916, and a regularization layer 918. The input of the encoder section is feature information of the candidate sequence which is extracted by the feature extraction module 210. If the candidate sequence s includes the candidate indicator(s) corresponding to the dimension(s) 172 of the dataset 170 and/or a candidate analysis operation 202, the feature information input to the multi-head self-attention layer 912 includes the feature information portion of the involved dimension(s) 172 and the following analysis operation 202. If the candidate sequence s includes, for example, the separator and/or the start symbol, the feature extraction module 210 may provide feature information of the separator and/or the start symbol, which may be represented in form of a vector or an embedded representation to characterize the specific symbols.

The output of each network layer 902 is provided directly to the decoder section, which includes a multi-head self-attention layer 921, a regularization layer 922, a multi-head self-attention layer 923, a regularization layer 924, a feed forward layer 925, and a regularization layer 926. The input of the encoder section is fixed, all coming from the feature information extracted by the feature extraction module 210 and corresponding to the respective predetermined symbols in the action space $\mathcal{A}_\mathcal{D}$. The specific processing of the multi-head self-attention layer 912, regularization layer 914, feed forward layer 916, and regularization layer 918 at the encoder section, and the specific processing of the multi-head self-attention layer 921, regularization layer 923, multi-head self-attention layer 925, regularization layer 927, and feed forward layer 929 at the decoder section are well known by those skilled in the art of natural language processing, and various variations are possible. The implementation of the subject matter as described herein is not limited in this regard.

After the execution of the decoder section of N network layers 902 is completed, the output of the regularization layer 926 is provided to a linear transformation layer 940, subjected to linear transformation performed by the linear transformation layer 940, and then provided to a Softmax output layer 950. The Softmax output layer 950 determines, using a Softmax function, candidate sequence metrics for candidate sequences composed of the current candidate sequence (i.e., the state s) and $\mathcal{A}_\mathcal{D}$, where the candidate sequence metrics are represented as a metric vector Q(s, $A_D$), each element corresponding to a candidate sequence matric of a candidate sequence.

Different from generating a next word one by one using the decoder section in the tasks such as neural machine translation (NMT), in the example implementation of FIG. 9 of the subject matter as described herein, the selection of the target analysis sequences and the determination of the metrics are based on the generated Q(s, $A_D$), and the candidate sequences to be assessed grow during in the processing.

In some implementations, in order to improve the efficiency of searching in the action space $\mathcal{A}_\mathcal{D}$, the heuristic beam searching may be used to reduce the number of candidate sequences to be assessed in the processing, so that a plurality of target analysis sequences for subsequent recommendation and corresponding sequence metrics may be determined for the dataset 170. In each round of search by the heuristic beam searching, the neural network model 810 selects a predetermined number of predetermined symbols from the action space $\mathcal{A}_\mathcal{D}$, and only selects a new candidate sequence sa formed by the a with a maximum metric and the candidate sequence s. In addition, the number of times of search may be constrained, and the processing is stopped after reaching an upper limit of the number of times of search.

According to the above process, the neural network model 810 may determine a plurality of target analysis sequences and corresponding sequence metrics from a set of predetermined symbols. The corresponding meanings of the symbols in the target analysis sequences are clear, and the target analysis sequences may be converted into corresponding combinations including the dimension(s) 172 and the candidate analysis operations 202, used as recommendations for the candidate analysis.

In some implementations, the neural network model 810 is trained based on a supervised learning algorithm, and the training data includes a plurality of training datasets and a plurality of ground-truth analysis patterns applied to the plurality of training datasets. In order to implement the model training, the plurality of ground-truth analysis patterns are converted into corresponding training analysis sequences, and the conversion of such training analysis sequences follows the analysis language as discussed above. Such training data may be obtained from datasets that are actually created by users and corresponding analysis patterns applied to the datasets. In some implementations, if samples of the available training datasets and ground-truth analysis patterns are limited, this may lead to a bias issue in the neural network model 810. This is because the neural network model 810 can be aware of the ground-truth analysis patterns in the training phrase, but only obtain its prediction results in the model application phase. Therefore, in the training of the neural network model 810, the neural network model 810 may deviate significantly from the target analysis sequences that should actually be generated. To train a better model, in some implementations, a reinforcement learning technique may be applied to train the neural network model 810.

Specifically, in some implementations, noise may be randomly added to the training data, for example, by adding noise to the training datasets or the ground-truth analysis patterns (e.g., randomly change the training datasets or the ground-truth analysis patterns) to create more negative training samples. In some implementations, if the neural network model 810 generates the target analysis sequences using the heuristic beam searching technique, the candidate sequences generated at each search may be stored. The model may be continuously optimized by periodically retraining the neural network model 810 with training data randomly selected from the stored candidate sequences s. For different processed datasets, the samples may be collected in this way such that more varied samples are obtain to optimize the model in a faster way. That is, the neural network model 810 may be first trained based on the limited training datasets and the ground-truth analysis patterns, and after more datasets and analysis patterns are collected during the model application phase as training data for subsequent retraining. Such iterative optimization may gradually improve the performance of the model.

Example Process

Figure 10:
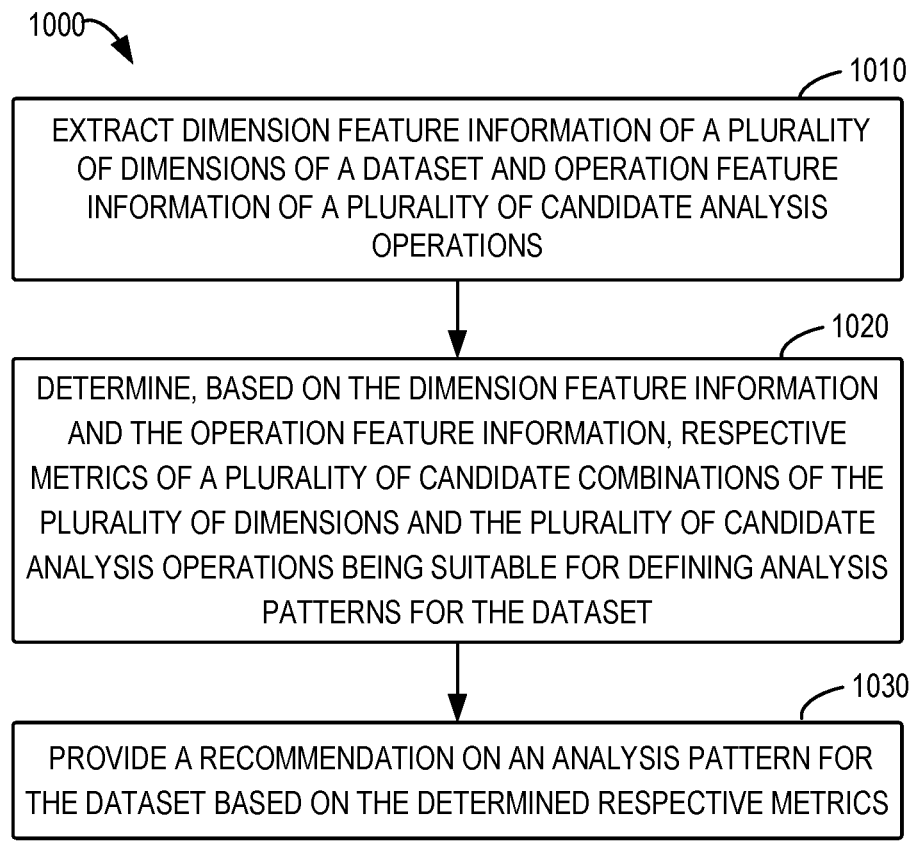
FIG. 10 illustrates a flowchart of a process in accordance with an implementation of the subject matter described herein.

FIG. 10 illustrates a flowchart of a process 1000 in accordance with some implementations of the subject matter described herein. The process 1000 can be implemented by the computing device 100, for example, by the analysis recommendation module 122 in the memory 120 of the computing device 100.

At block 1010, the computing device 100 extracts dimension feature information of a plurality of dimensions of a dataset and operation feature information of a plurality of candidate analysis operations, the plurality of dimensions of the dataset comprising corresponding data items. At block 1020, the computing device 100 determines, based on the dimension feature information and the operation feature information, respective metrics of a plurality of candidate combinations of the plurality of dimensions and the plurality of candidate analysis operations being suitable for defining analysis patterns for the dataset. The analysis pattern comprises at least one dimension to be analyzed and at least one analysis operation to be performed on the at least one dimension. At block 1030, the computing device 100 provides a recommendation on an analysis pattern for the dataset based on the determined respective metrics, the recommendation indicating at least one of the plurality of candidate combinations.

In some implementations, at least one of the at least one dimension to be analyzed and the at least one analysis operation in the analysis pattern is pre-specified, and each of the plurality of candidate combinations comprises the pre-specified at least one of the at least one dimension to be analyzed and the at least one analysis operation.

In some implementations, determining the respective metrics of the plurality of candidate combinations comprises: generating a plurality of candidate dimension combinations from the plurality of dimensions, each candidate dimension combination comprising at least one of the plurality of dimensions; determining, based on the dimension feature information, respective dimension combination metrics of the plurality of candidate dimension combinations being suitable for serving as at least one dimension to be analyzed in an analysis pattern; selecting, based on the respective dimension combination metrics, at least one of the plurality of candidate dimension combinations for combining with the plurality of candidate analysis operations to form the plurality of candidate combinations, each of the plurality of candidate combinations comprising a selected candidate dimension combination and at least one of the plurality of candidate analysis operations; and determining the respective metrics of the plurality of candidate combinations based on the dimension feature information and the operation feature information.

In some implementations, determining the respective dimension combination metrics comprises: determining, using a first decision tree-based model, the respective dimension combination metrics based on the dimension feature information. In some embodiments, determining the respective metrics of the plurality of candidate combinations comprises: determining, using a second decision tree-based model, the respective metrics of the plurality of candidate combinations based on the dimension feature information and the operation feature information.

In some implementations, the at least one dimension to be analyzed comprises at least one grouping dimension for grouping data items. In some implementations, generating the plurality of candidate dimension combinations comprises: determining a plurality of grouping dimension candidates from the plurality of dimensions, each grouping dimension candidate comprising at least one of the plurality of dimensions; determining, based on the dimension feature information, respective first metrics of the plurality of grouping dimension candidates being suitable for serving as grouping dimensions; selecting a first predetermined number of grouping dimension candidates from the plurality of grouping dimension candidates based on the respective first metrics; and generating the plurality of candidate dimension combinations based on the first predetermined number of selected grouping dimension candidates.

In some implementations, in the analysis pattern, the at least one grouping dimension acts as a corresponding analysis role in the analysis operation. In some implementations, generating the plurality of candidate dimension combinations based on the first predetermined number of selected grouping dimension candidates comprises: obtaining a grouping dimension requirement associated with the analysis pattern, the grouping dimension requirement indicating the number of grouping dimensions required by each analysis role in the analysis pattern; and selecting, from the first predetermined number of selected grouping dimension candidates, grouping dimension candidates meeting the grouping dimension requirement to form the plurality of candidate dimension combinations.

In some implementations, determining the respective first metrics of the plurality of grouping dimension candidates being suitable for serving as grouping dimensions comprises: determining, through heuristic beam searching, the respective first metrics of the plurality of grouping dimension candidates being suitable for serving as grouping dimensions.

In some implementations, the at least one dimension to be analyzed comprises: at least one numeric dimension comprising numeric data items. In some implementations, generating the plurality of candidate dimension combinations comprises: determining a plurality of numeric dimension candidates from the plurality of dimensions, each numeric dimension candidate comprising at least one of the plurality of dimensions; determining, based on the dimension feature information, respective second metrics of the plurality of numeric dimension candidates being suitable for serving as numeric dimensions; and selecting, based on the respective second metrics, a second predetermined number of numeric dimension candidates from the plurality of numeric dimension candidates to form the plurality of candidate dimension combinations.

In some implementations, determining the respective metrics of the plurality of candidate combinations comprises:

determining a set of predetermined symbols associated with the dataset, the set of predetermined symbols comprising a separator and a plurality of candidate indicators for respectively indicating the plurality of dimensions and the plurality of candidate analysis operations; and according to a predetermined rule associated with an analysis pattern, determining, based on the dimension feature information and the operation feature information, respective sequence metrics of a plurality of target analysis sequences formed by symbols from the set of predetermined symbols, each target analysis sequence corresponding to one of the plurality of candidate combinations and comprising candidate indicators of the plurality of candidate indicators and at least one occurrence of the separator for separating the candidate indicators of the plurality of candidate indicators.

In some implementations, the set of predetermined symbols further comprises a start symbol indicating a sequence start, and determining the respective sequence metrics of the plurality of target analysis sequences further comprises: obtaining an initial sequence comprising the start symbol; and determining a target analysis sequence suitable for completely defining the analysis pattern and a sequence metric of the target analysis sequence, according to a Markov Decision process with the initial sequence as an initial state and based on an action space formed by the set of predetermined symbols.

In some implementations, determining the target analysis sequence suitable for completely defining the analysis pattern and the sequence metric of the target analysis sequence comprises: iteratively performing the following for at least one time: obtaining a plurality of candidate sequences as a plurality of transition states by selecting, from the action space formed by the set of predetermined symbols and according to the predetermined rule, different predetermined symbols to attach to the initial sequence; determining respective candidate sequence metrics of the plurality of candidate sequences being suitable for at least partially defining the analysis pattern by optimizing an action-value function associated with transitions from a current state corresponding to the initial sequence to the respective transition states, based on feature information portions of the dimension feature information and the operation feature information corresponding to predetermined symbols in the plurality of candidate sequences; selecting a candidate sequence from the plurality of candidate sequences based on the respective candidate sequence metrics of the plurality of candidate sequences; and in accordance with a determination that the selected candidate sequence fails to completely define the analysis pattern, updating the initial sequence to be the selected candidate sequence, and in accordance with a determination that the selected candidate sequence completely defines the analysis pattern, determining the candidate sequence as the target analysis sequence, and determining the corresponding candidate sequence metric of the candidate sequence as the sequence metric of the target analysis sequence.

In some implementations, the at least one dimension to be analyzed comprises at least one of the following: at least one grouping dimension for grouping data items and at least one numeric dimension comprising numeric data items. In some implementations, the predetermined rule defines at least one of the following: a relative location relationship of predetermined symbols corresponding to the at least one grouping dimension, the at least one numeric dimension, and the analysis operation of the analysis pattern within a candidate sequence; no repeated occurrence of each of the plurality of candidate indicators within a candidate sequence; separation of different analysis roles played by a plurality of grouping dimensions in the analysis operation by the separator in a candidate sequence, the at least one grouping dimension comprising the plurality of grouping dimensions; separation of indicators corresponding to the at least one dimension to be analyzed and at least one analysis operation in the analysis pattern by the separator in a candidate sequence; and separation of the at least one grouping dimension and the at least one numeric dimension by the separator, the at least one dimension to be analyzed comprising both the at least one grouping dimension and the at least one numeric dimension.

In some implementations, determining the respective candidate sequence metrics of the plurality of candidate sequences comprises: determining the respective candidate sequence metrics of the plurality of candidate sequences using a neural network model suitable for natural language processing or programming language processing. The neural network model is trained based on the following: a plurality of training datasets and respective training analysis sequences corresponding to a plurality of ground-truth analysis patterns applicable to the plurality of training datasets.

In some implementations, the extracted dimension feature information comprises at least one of the following: a semantic feature representation of dimension names of a plurality of dimensions, and a data distribution feature representation of data items corresponding to the plurality of dimensions. In some implementations, the extracted operation feature information comprises a semantic feature representation of at least one of operation names and descriptive information of the plurality of candidate analysis operations.

In some implementations, providing the recommendation on the analysis pattern for the dataset comprises: determining, from the plurality of candidate combinations, at least one candidate combination with the corresponding metric exceeding a threshold metric; causing the at least one candidate combination to be presented; and in accordance with reception of an indication of a candidate combination of the at least one candidate combination being selected, applying an analysis pattern defined by the selected candidate combination to the dataset.

Example Implementations

Some example implementations of the subject matter described herein are listed below.

In an aspect, the subject matter described herein provides a computer-implemented method. The method comprises: extracting dimension feature information of a plurality of dimensions of a dataset and operation feature information of a plurality of candidate analysis operations, the plurality of dimensions of the dataset comprising corresponding data items; determining, based on the dimension feature information and the operation feature information, respective metrics of a plurality of candidate combinations of the plurality of dimensions and the plurality of candidate analysis operations being suitable for defining analysis patterns for the dataset, an analysis pattern comprising at least one dimension to be analyzed and at least one analysis operation to be performed on the at least one dimension; and providing a recommendation on an analysis pattern for the dataset based on the determined respective metrics, the recommendation indicating at least one of the plurality of candidate combinations.

In some implementations, at least one of the at least one dimension to be analyzed and the at least one analysis operation in the analysis pattern is pre-specified, and each of the plurality of candidate combinations comprises the pre-specified at least one of the at least one dimension to be analyzed and the at least one analysis operation.

In some implementations, determining the respective metrics of the plurality of candidate combinations comprise: generating a plurality of candidate dimension combinations from the plurality of dimensions, each candidate dimension combination comprising at least one of the plurality of dimensions; based on the dimension feature information, determining respective dimension combination metrics of the plurality of candidate dimension combinations being suitable for serving as at least one dimension to be analyzed in an analysis pattern; selecting, based on the respective dimension combination metrics, at least one of the plurality of candidate dimension combinations for combining with the plurality of candidate analysis operations to form the plurality of candidate combinations, each of the plurality of candidate combinations comprising a selected candidate dimension combination and at least one of the plurality of candidate analysis operations; and determining the respective metrics of the plurality of candidate combinations based on the dimension feature information and the operation feature information.

In some implementations, determining the respective dimension combination metrics comprises: determining, using a first decision tree-based model, the respective dimension combination metrics based on the dimension feature information. In some embodiments, determining the respective metrics of the plurality of candidate combinations comprises: determining, using a second decision tree-based model, the respective metrics of the plurality of candidate combinations based on the dimension feature information and the operation feature information.

In some implementations, the at least one dimension to be analyzed comprises at least one grouping dimension for grouping data items. In some implementations, generating the plurality of candidate dimension combinations comprises: determining a plurality of grouping dimension candidates from the plurality of dimensions, each grouping dimension candidate comprising at least one of the plurality of dimensions; determining, based on the dimension feature information, respective first metrics of the plurality of grouping dimension candidates being suitable for serving as grouping dimensions; selecting a first predetermined number of grouping dimension candidates from the plurality of grouping dimension candidates based on the respective first metrics; and generating the plurality of candidate dimension combinations based on the first predetermined number of selected grouping dimension candidates.

In some implementations, in the analysis pattern, the at least one grouping dimension acts as a corresponding analysis role in the analysis operation. In some implementations, generating the plurality of candidate dimension combinations based on the first predetermined number of selected grouping dimension candidates comprises: obtaining a grouping dimension requirement associated with the analysis pattern, the grouping dimension requirement indicating the number of grouping dimensions required by each analysis role in the analysis pattern; and selecting, from the first predetermined number of selected grouping dimension candidates, grouping dimension candidates meeting the grouping dimension requirement to form the plurality of candidate dimension combinations.

In some implementations, determining the respective first metrics of the plurality of grouping dimension candidates being suitable for serving as grouping dimensions comprises: determining, through heuristic beam searching, the respective first metrics of the plurality of grouping dimension candidates being suitable for serving as grouping dimensions.

In some implementations, the at least one dimension to be analyzed comprises: at least one numeric dimension comprising numeric data items. In some implementations, generating the plurality of candidate dimension combinations comprises: determining a plurality of numeric dimension candidates from the plurality of dimensions, each numeric dimension candidate comprising at least one of the plurality of dimensions; determining, based on the dimension feature information, respective second metrics of the plurality of numeric dimension candidates being suitable for serving as numeric dimensions; and selecting, based on the respective second metrics, a second predetermined number of numeric dimension candidates from the plurality of numeric dimension candidates to form the plurality of candidate dimension combinations.

In some implementations, determining the respective metrics of the plurality of candidate combinations comprises: determining a set of predetermined symbols associated with the dataset, the set of predetermined symbols comprising a separator and a plurality of candidate indicators for respectively indicating the plurality of dimensions and the plurality of candidate analysis operations; and according to a predetermined rule associated with an analysis pattern, determining, based on the dimension feature information and the operation feature information, respective sequence metrics of a plurality of target analysis sequences formed by symbols from the set of predetermined symbols, each target analysis sequence corresponding to one of the plurality of candidate combinations and comprising candidate indicators of the plurality of candidate indicators and at least one occurrence of the separator for separating the candidate indicators of the plurality of candidate indicators.

In some implementations, the set of predetermined symbols further comprises a start symbol indicating a sequence start, and determining the respective sequence metrics of the plurality of target analysis sequences further comprises: obtaining an initial sequence comprising the start symbol; and determining a target analysis sequence suitable for completely defining the analysis pattern and a sequence metric of the target analysis sequence, according to a Markov Decision process with the initial sequence as an initial state and based on an action space formed by the set of predetermined symbols.

In some implementations, determining the target analysis sequence suitable for completely defining the analysis pattern and the sequence metric of the target analysis sequence comprises: iteratively performing the following for at least one time: obtaining a plurality of candidate sequences as a plurality of transition states by selecting, from the action space formed by the set of predetermined symbols and according to the predetermined rule, different predetermined symbols to attach to the initial sequence;

determining respective candidate sequence metrics of the plurality of candidate sequences being suitable for at least partially defining the analysis pattern by optimizing an action-value function associated with transitions from a current state corresponding to the initial sequence to the respective transition states, based on feature information portions of the dimension feature information and the operation feature information corresponding to predetermined symbols in the plurality of candidate sequences; selecting a candidate sequence from the plurality of candidate sequences based on the respective candidate sequence metrics of the plurality of candidate sequences; and in accordance with a determination that the selected candidate sequence fails to completely define the analysis pattern, updating the initial sequence to be the selected candidate sequence, and in accordance with a determination that the selected candidate sequence completely defines the analysis pattern, determining the candidate sequence as the target analysis sequence, and determining the corresponding candidate sequence metric of the candidate sequence as the sequence metric of the target analysis sequence.

In some implementations, the at least one dimension to be analyzed comprises at least one of the following: at least one grouping dimension for grouping data items and at least one numeric dimension comprising numeric data items. In some implementations, the predetermined rule defines at least one of the following: a relative location relationship of predetermined symbols corresponding to the at least one grouping dimension, the at least one numeric dimension, and the analysis operation of the analysis pattern within a candidate sequence; no repeated occurrence of each of the plurality of candidate indicators within a candidate sequence; separation of different analysis roles played by a plurality of grouping dimensions in the analysis operation by the separator in a candidate sequence, the at least one grouping dimension comprising the plurality of grouping dimensions; separation of indicators corresponding to the at least one dimension to be analyzed and at least one analysis operation in the analysis pattern by the separator in a candidate sequence; and separation of the at least one grouping dimension and the at least one numeric dimension by the separator, the at least one dimension to be analyzed comprising both the at least one grouping dimension and the at least one numeric dimension.

In some implementations, determining the respective candidate sequence metrics of the plurality of candidate sequences comprises: determining the respective candidate sequence metrics of the plurality of candidate sequences using a neural network model suitable for natural language processing or programming language processing. The neural network model is trained based on the following: a plurality of training datasets and respective training analysis sequences corresponding to a plurality of ground-truth analysis patterns applicable to the plurality of training datasets.

In some implementations, the extracted dimension feature information comprises at least one of the following: a semantic feature representation of dimension names of the plurality of dimensions, and a data distribution feature representation of data items corresponding to the plurality of dimensions. In some implementations, the extracted operation feature information comprises a semantic feature representation of at least one of operation names and descriptive information of the plurality of candidate analysis operations.

In some implementations, providing the recommendation on the analysis pattern for the dataset comprises: determining, from the plurality of candidate combinations, at least one candidate combination with the corresponding metric exceeding a threshold metric; causing the at least one candidate combination to be presented; and in accordance with reception of an indication of a candidate combination of the at least one candidate combination being selected, applying an analysis pattern defined by the selected candidate combination to the dataset.

In another aspect, the subject matter described herein provides an electronic device. The electronic device comprises: a processing unit; and a memory coupled to the processing unit and having instructions stored thereon, the instructions, when executed by the processing unit, causing the device to perform acts of: extracting dimension feature information of a plurality of dimensions of a dataset and operation feature information of a plurality of candidate analysis operations, the plurality of dimensions of the dataset comprising corresponding data items; determining, based on the dimension feature information and the operation feature information, respective metrics of a plurality of candidate combinations of the plurality of dimensions and the plurality of candidate analysis operations being suitable for defining analysis patterns for the dataset, an analysis pattern comprising at least one dimension to be analyzed and at least one analysis operation to be performed on the at least one dimension; and providing a recommendation on an analysis pattern for the dataset based on the determined respective metrics, the recommendation indicating at least one of the plurality of candidate combinations.

In some implementations, at least one of the at least one dimension to be analyzed and the at least one analysis operation in the analysis pattern is pre-specified, and each of the plurality of candidate combinations comprises the pre-specified at least one of the at least one dimension to be analyzed and the at least one analysis operation.

In some implementations, determining the respective metrics of the plurality of candidate combinations comprise: generating a plurality of candidate dimension combinations from the plurality of dimensions, each candidate dimension combination comprising at least one of the plurality of dimensions; based on the dimension feature information, determining respective dimension combination metrics of the plurality of candidate dimension combinations being suitable for serving as at least one dimension to be analyzed in an analysis pattern; selecting, based on the respective dimension combination metrics, at least one of the plurality of candidate dimension combinations for combining with the plurality of candidate analysis operations to form the plurality of candidate combinations, each of the plurality of candidate combinations comprising a selected candidate dimension combination and at least one of the plurality of candidate analysis operations; and determining the respective metrics of the plurality of candidate combinations based on the dimension feature information and the operation feature information.

In some implementations, determining the respective dimension combination metrics comprises: determining, using a first decision tree-based model, the respective dimension combination metrics based on the dimension feature information. In some embodiments, determining the respective metrics of the plurality of candidate combinations comprises: determining, using a second decision tree-based model, the respective metrics of the plurality of candidate combinations based on the dimension feature information and the operation feature information.

In some implementations, the at least one dimension to be analyzed comprises at least one grouping dimension for grouping data items. In some implementations, generating the plurality of candidate dimension combinations comprises: determining a plurality of grouping dimension candidates from the plurality of dimensions, each grouping dimension candidate comprising at least one of the plurality of dimensions; determining, based on the dimension feature information, respective first metrics of the plurality of grouping dimension candidates being suitable for serving as grouping dimensions; selecting a first predetermined number of grouping dimension candidates from the plurality of grouping dimension candidates based on the respective first metrics; and generating the plurality of candidate dimension combinations based on the first predetermined number of selected grouping dimension candidates.

In some implementations, in the analysis pattern, the at least one grouping dimension acts as a corresponding analysis role in the analysis operation. In some implementations, generating the plurality of candidate dimension combinations based on the first predetermined number of selected grouping dimension candidates comprises: obtaining a grouping dimension requirement associated with the analysis pattern, the grouping dimension requirement indicating the number of grouping dimensions required by each analysis role in the analysis pattern; and selecting, from the first predetermined number of selected grouping dimension candidates, grouping dimension candidates meeting the grouping dimension requirement to form the plurality of candidate dimension combinations.

In some implementations, determining the respective first metrics of the plurality of grouping dimension candidates being suitable for serving as grouping dimensions comprises: determining, through heuristic beam searching, the respective first metrics of the plurality of grouping dimension candidates being suitable for serving as grouping dimensions.

In some implementations, the at least one dimension to be analyzed comprises: at least one numeric dimension comprising numeric data items. In some implementations, generating the plurality of candidate dimension combinations comprises: determining a plurality of numeric dimension candidates from the plurality of dimensions, each numeric dimension candidate comprising at least one of the plurality of dimensions; determining, based on the dimension feature information, respective second metrics of the plurality of numeric dimension candidates being suitable for serving as numeric dimensions; and selecting, based on the respective second metrics, a second predetermined number of numeric dimension candidates from the plurality of numeric dimension candidates to form the plurality of candidate dimension combinations.

In some implementations, determining the respective metrics of the plurality of candidate combinations comprises: determining a set of predetermined symbols associated with the dataset, the set of predetermined symbols comprising a separator and a plurality of candidate indicators for respectively indicating the plurality of dimensions and the plurality of candidate analysis operations; and according to a predetermined rule associated with an analysis pattern, determining, based on the dimension feature information and the operation feature information, respective sequence metrics of a plurality of target analysis sequences formed by symbols from the set of predetermined symbols, each target analysis sequence corresponding to one of the plurality of candidate combinations and comprising candidate indicators of the plurality of candidate indicators and at least one occurrence of the separator for separating the candidate indicators of the plurality of candidate indicators.

In some implementations, the set of predetermined symbols further comprises a start symbol indicating a sequence start, and determining the respective sequence metrics of the plurality of target analysis sequences further comprises: obtaining an initial sequence comprising the start symbol; and determining a target analysis sequence suitable for completely defining the analysis pattern and a sequence metric of the target analysis sequence, according to a Markov Decision process with the initial sequence as an initial state and based on an action space formed by the set of predetermined symbols.

In some implementations, determining the target analysis sequence suitable for completely defining the analysis pattern and the sequence metric of the target analysis sequence comprises: iteratively performing the following for at least one time: obtaining a plurality of candidate sequences as a plurality of transition states by selecting, from the action space formed by the set of predetermined symbols and according to the predetermined rule, different predetermined symbols to attach to the initial sequence; determining respective candidate sequence metrics of the plurality of candidate sequences being suitable for at least partially defining the analysis pattern by optimizing an action-value function associated with transitions from a current state corresponding to the initial sequence to the respective transition states, based on feature information portions of the dimension feature information and the operation feature information corresponding to predetermined symbols in the plurality of candidate sequences; selecting a candidate sequence from the plurality of candidate sequences based on the respective candidate sequence metrics of the plurality of candidate sequences; and in accordance with a determination that the selected candidate sequence fails to completely define the analysis pattern, updating the initial sequence to be the selected candidate sequence, and in accordance with a determination that the selected candidate sequence completely defines the analysis pattern, determining the candidate sequence as the target analysis sequence, and determining the corresponding candidate sequence metric of the candidate sequence as the sequence metric of the target analysis sequence.

In some implementations, the at least one dimension to be analyzed comprises at least one of the following: at least one grouping dimension for grouping data items and at least one numeric dimension comprising numeric data items. In some implementations, the predetermined rule defines at least one of the following: a relative location relationship of predetermined symbols corresponding to the at least one grouping dimension, the at least one numeric dimension, and the analysis operation of the analysis pattern within a candidate sequence; no repeated occurrence of each of the plurality of candidate indicators within a candidate sequence; separation of different analysis roles played by a plurality of grouping dimensions in the analysis operation by the separator in a candidate sequence, the at least one grouping dimension comprising the plurality of grouping dimensions; separation of indicators corresponding to the at least one dimension to be analyzed and at least one analysis operation in the analysis pattern by the separator in a candidate sequence; and separation of the at least one grouping dimension and the at least one numeric dimension by the separator, the at least one dimension to be analyzed comprising both the at least one grouping dimension and the at least one numeric dimension.

In some implementations, determining the respective candidate sequence metrics of the plurality of candidate sequences comprises: determining the respective candidate sequence metrics of the plurality of candidate sequences using a neural network model suitable for natural language processing or programming language processing. The neural network model is trained based on the following: a plurality of training datasets and respective training analysis sequences corresponding to a plurality of ground-truth analysis patterns applicable to the plurality of training datasets.

In some implementations, the extracted dimension feature information comprises at least one of the following: a semantic feature representation of dimension names of the plurality of dimensions, and a data distribution feature representation of data items corresponding to the plurality of dimensions. In some implementations, the extracted operation feature information comprises a semantic feature representation of at least one of operation names and descriptive information of the plurality of candidate analysis operations.

In some implementations, providing the recommendation on the analysis pattern for the dataset comprises: determining, from the plurality of candidate combinations, at least one candidate combination with the corresponding metric exceeding a threshold metric;

causing the at least one candidate combination to be presented; and in accordance with reception of an indication of a candidate combination of the at least one candidate combination being selected, applying an analysis pattern defined by the selected candidate combination to the dataset.

In still a further aspect, the subject matter described herein provides a computer program product being tangibly stored on a non-transient computer storage medium and comprising machine-executable instructions which, when executed by a device, cause the device to perform one or more implementations of the above method.

In still a further aspect, the subject matter described herein provides a computer readable medium having machine-executable instructions stored thereon which, when executed by a device, cause a device to perform one or more implementations of the above method.

The functionalities described herein can be performed, at least in part, by one or more hardware logic components. For example, and without limitation, illustrative types of hardware logic components that can be used include field-programmable gate arrays (FPGAs), Application-specific Integrated Circuits (ASICs), application-specific standard products (ASSPs), system-on-a-chip systems (SOCs), complex programmable logic devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. An electronic device, comprising:
a processing unit; and
a memory coupled to the processing unit and having instructions stored thereon, the instructions, when executed by the processing unit, causing the device to perform acts of:
extracting dimension feature information of a plurality of dimensions of a dataset and operation feature information of a plurality of candidate analysis operations, the plurality of dimensions of the dataset comprising corresponding data items;
determining, based on the dimension feature information and the operation feature information, respective metrics of a plurality of candidate combinations of the plurality of dimensions and the plurality of candidate analysis operations being suitable for defining an analysis pattern for the dataset, the analysis pattern comprising at least one dimension to be analyzed and at least one analysis operation to be performed on the at least one dimension, the respective metrics determined at least in part by:
determining a set of predetermined symbols associated with the dataset, the set of predetermined symbols comprising a separator and a plurality of candidate indicators for respectively indicating the plurality of dimensions and the plurality of candidate analysis operations; and
according to a predetermined rule associated with an analysis pattern and based on the dimension feature information and the operation feature information, determining respective sequence metrics of a plurality of target analysis sequences formed by symbols from the set of predetermined symbols, each target analysis sequence corresponding to one of the plurality of candidate combinations and comprising candidate indicators of the plurality of candidate indicators and at least one occurrence of the separator for separating the candidate indicators of the plurality of candidate indicators; and providing a recommendation on an analysis pattern for the dataset based on the determined respective metrics, the recommendation indicating at least one of the plurality of candidate combinations.

2. The device of claim 1, wherein at least one of the at least one dimension to be analyzed and the at least one analysis operation in the analysis pattern is pre-specified, and wherein each of the plurality of candidate combinations comprises the pre-specified at least one of the at least one dimension to be analyzed and the at least one analysis operation.

3. The device of claim 1, wherein determining the respective metrics of the plurality of candidate combinations comprises:

generating a plurality of candidate dimension combinations from the plurality of dimensions, each candidate dimension combination comprising at least one of the plurality of dimensions;

determining, based on the dimension feature information, respective dimension combination metrics of the plurality of candidate dimension combinations being suitable for serving as at least one dimension to be analyzed in an analysis pattern;

selecting, based on the respective dimension combination metrics, at least one of the plurality of candidate dimension combinations for combining with the plurality of candidate analysis operations to form the plurality of candidate combinations, each of the plurality of candidate combinations comprising a selected candidate dimension combination and at least one of the plurality of candidate analysis operations; and determining the respective metrics of the plurality of candidate combinations based on the dimension feature information and the operation feature information.

4. The device of claim 3, wherein determining the respective dimension combination metrics comprises: determining, using a first decision tree-based model, the respective dimension combination metrics based on the dimension feature information; and/or wherein determining the respective metrics of the plurality of candidate combinations comprises: determining, using a second decision tree-based model, the respective metrics of the plurality of candidate combinations based on the dimension feature information and the operation feature information.

5. The device of claim 3, wherein the at least one dimension to be analyzed comprises at least one grouping dimension for grouping data items, and wherein generating the plurality of candidate dimension combinations comprises:

determining a plurality of grouping dimension candidates from the plurality of dimensions, each grouping dimension candidate comprising at least one of the plurality of dimensions;

determining, based on the dimension feature information, respective first metrics of the plurality of grouping dimension candidates being suitable for serving as grouping dimensions;

selecting a first predetermined number of grouping dimension candidates from the plurality of grouping dimension candidates based on the respective first metrics; and generating the plurality of candidate dimension combinations based on the first predetermined number of selected grouping dimension candidates.

6. The device of claim 5, wherein in the analysis pattern, the at least one grouping dimension acts as a corresponding analysis role in the analysis operation; and wherein generating the plurality of candidate dimension combinations based on the first predetermined number of selected grouping dimension candidates comprises:

obtaining a grouping dimension requirement associated with the analysis pattern, the grouping dimension requirement indicating the number of grouping dimensions required by each analysis role in the analysis pattern; and selecting, from the first predetermined number of selected grouping dimension candidates, grouping dimension candidates meeting the grouping dimension requirement to form the plurality of candidate dimension combinations.

7. The device of claim 5, wherein determining the respective first metrics of the plurality of grouping dimension candidates being suitable for serving as grouping dimensions comprises:

determining, through heuristic beam searching, the respective first metrics of the plurality of grouping dimension candidates being suitable for serving as grouping dimensions.

8. The device of claim 3, wherein the at least one dimension to be analyzed comprises: at least one numeric dimension comprising numeric data items, and wherein generating the plurality of candidate dimension combinations comprises:

determining a plurality of numeric dimension candidates from the plurality of dimensions, each numeric dimension candidate comprising at least one of the plurality of dimensions;

determining, based on the dimension feature information, respective second metrics of the plurality of numeric dimension candidates being suitable for serving as numeric dimensions; and selecting, based on the respective second metrics, a second predetermined number of numeric dimension candidates from the plurality of numeric dimension candidates to form the plurality of candidate dimension combinations.

9. The device of claim 1, wherein the set of predetermined symbols further comprises a start symbol indicating a sequence start, and wherein determining the respective sequence metrics of the plurality of target analysis sequences further comprises:

obtaining an initial sequence comprising the start symbol; and determining a target analysis sequence suitable for completely defining the analysis pattern and a sequence metric of the target analysis sequence, according to a Markov Decision process with the initial sequence as an initial state and based on an action space formed by the set of predetermined symbols.

10. The device of claim 9, wherein determining the target analysis sequence suitable for completely defining the analysis pattern and the sequence metric of the target analysis sequence comprises:

iteratively performing the following for at least one time:
obtaining a plurality of candidate sequences as a plurality of transition states by selecting, from the action space formed by the set of predetermined symbols and according to the predetermined rule, different predetermined symbols to attach to the initial sequence;
determining respective candidate sequence metrics of the plurality of candidate sequences being suitable for at least partially defining the analysis pattern by optimizing an action-value function associated with transitions from a current state corresponding to the initial sequence to the respective transition states, based on feature information portions of the dimension feature information and the operation feature information corresponding to predetermined symbols in the plurality of candidate sequences;
selecting a candidate sequence from the plurality of candidate sequences based on the respective candidate sequence metrics of the plurality of candidate sequences; and
in accordance with a determination that the selected candidate sequence fails to completely define the analysis pattern, updating the initial sequence to be the selected candidate sequence; and
in accordance with a determination that the selected candidate sequence completely defines the analysis pattern, determining the candidate sequence as the target analysis sequence, and determining the corresponding candidate sequence metric of the candidate sequence as the sequence metric of the target analysis sequence.

11. The device of claim 1, wherein the at least one dimension to be analyzed comprises at least one of the following: at least one grouping dimension for grouping data items and at least one numeric dimension comprising numeric data items, and
wherein the predetermined rule defines at least one of the following:
a relative location relationship of predetermined symbols corresponding to the at least one grouping dimension, the at least one numeric dimension, and the analysis operation of the analysis pattern within a candidate sequence,
no repeated occurrence of each of the plurality of candidate indicators within a candidate sequence,
separation of different analysis roles played by a plurality of grouping dimensions in the analysis operation by the separator in a candidate sequence, the at least one grouping dimension comprising the plurality of grouping dimensions,
separation of indicators corresponding to the at least one dimension to be analyzed and at least one analysis operation in the analysis pattern by the separator in a candidate sequence, and
separation of the at least one grouping dimension and the at least one numeric dimension by the separator, the at least one dimension to be analyzed comprising both the at least one grouping dimension and the at least one numeric dimension.

12. A computer-implemented method comprising:
extracting dimension feature information of a plurality of dimensions of a dataset and operation feature information of a plurality of candidate analysis operations, the plurality of dimensions of the dataset comprising corresponding data items;
determining, based on the dimension feature information and the operation feature information, respective metrics of a plurality of candidate combinations of the plurality of dimensions and the plurality of candidate analysis operations being suitable for defining an analysis pattern for the dataset, the analysis pattern comprising at least one dimension to be analyzed and at least one analysis operation to be performed on the at least one dimension, the respective metrics determined at least in part by:
determining a set of predetermined symbols associated with the dataset, the set of predetermined symbols comprising a separator and a plurality of candidate indicators for respectively indicating the plurality of dimensions and the plurality of candidate analysis operations; and
according to a predetermined rule associated with an analysis pattern and based on the dimension feature information and the operation feature information, determining respective sequence metrics of a plurality of target analysis sequences formed by symbols from the set of predetermined symbols, each target analysis sequence corresponding to one of the plurality of candidate combinations and comprising candidate indicators of the plurality of candidate indicators and at least one occurrence of the separator for separating the candidate indicators of the plurality of candidate indicators; and
providing a recommendation on an analysis pattern for the dataset based on the determined respective metrics, the recommendation indicating at least one of the plurality of candidate combinations.

13. The method of claim 12, wherein at least one of the at least one dimension to be analyzed and the at least one analysis operation in the analysis pattern is pre-specified, and wherein each of the plurality of candidate combinations comprises the pre-specified at least one of the at least one dimension to be analyzed and the at least one analysis operation.

14. The method of claim 12, wherein determining the respective metrics of the plurality of candidate combinations comprises:
generating a plurality of candidate dimension combinations from the plurality of dimensions, each candidate dimension combination comprising at least one of the plurality of dimensions;
determining, based on the dimension feature information, respective dimension combination metrics of the plurality of candidate dimension combinations being suitable for serving as at least one dimension to be analyzed in an analysis pattern;
selecting, based on the respective dimension combination metrics, at least one of the plurality of candidate dimension combinations for combining with the plurality of candidate analysis operations to form the plurality of candidate combinations, each of the plurality of candidate combinations comprising a selected candidate dimension combination and at least one of the plurality of candidate analysis operations; and
determining the respective metrics of the plurality of candidate combinations based on the dimension feature information and the operation feature information.

15. At least one non-transitory machine-readable medium comprising instructions that, when executed by at least one processor, cause the at least one processor to perform operations to:
extract dimension feature information of a plurality of dimensions of a dataset and operation feature information of a plurality of candidate analysis operations, the plurality of dimensions of the dataset comprising corresponding data items;

determine, based on the dimension feature information and the operation feature information, respective metrics of a plurality of candidate combinations of the plurality of dimensions and the plurality of candidate analysis operations being suitable for defining an analysis pattern for the dataset, the analysis pattern comprising at least one dimension to be analyzed and at least one analysis operation to be performed on the at least one dimension, the respective metrics determined at least in part by:

determining a set of predetermined symbols associated with the dataset, the set of predetermined symbols comprising a separator and a plurality of candidate indicators for respectively indicating the plurality of dimensions and the plurality of candidate analysis operations; and according to a predetermined rule associated with an analysis pattern and based on the dimension feature information and the operation feature information, determining respective sequence metrics of a plurality of target analysis sequences formed by symbols from the set of predetermined symbols, each target analysis sequence corresponding to one of the plurality of candidate combinations and comprising candidate indicators of the plurality of candidate indicators and at least one occurrence of the separator for separating the candidate indicators of the plurality of candidate indicators; and provide a recommendation on an analysis pattern for the dataset based on the determined respective metrics, the recommendation indicating at least one of the plurality of candidate combinations.

16. The at least one non-transitory machine-readable medium of claim 15, wherein at least one of the at least one dimension to be analyzed and the at least one analysis operation in the analysis pattern is pre-specified, and wherein each of the plurality of candidate combinations comprises the pre-specified at least one of the at least one dimension to be analyzed and the at least one analysis operation.

17. The at least one non-transitory machine-readable medium of claim 15, the instructions to determine the respective metrics of the plurality of candidate combinations further comprising instructions to:

generate a plurality of candidate dimension combinations from the plurality of dimensions, each candidate dimension combination comprising at least one of the plurality of dimensions;

determine, based on the dimension feature information, respective dimension combination metrics of the plurality of candidate dimension combinations being suitable for serving as at least one dimension to be analyzed in an analysis pattern;

select, based on the respective dimension combination metrics, at least one of the plurality of candidate dimension combinations for combining with the plurality of candidate analysis operations to form the plurality of candidate combinations, each of the plurality of candidate combinations comprising a selected candidate dimension combination and at least one of the plurality of candidate analysis operations; and determine the respective metrics of the plurality of candidate combinations based on the dimension feature information and the operation feature information.

18. The at least one non-transitory machine-readable medium of claim 17, the instructions to determine the respective dimension combination metrics further comprising instructions to:

determine, using a first decision tree-based model, the respective dimension combination metrics based on the dimension feature information; and/or the instructions to determine the respective metrics of the plurality of candidate combinations further comprising instructions to:

determine, using a second decision tree-based model, the respective metrics of the plurality of candidate combinations based on the dimension feature information and the operation feature information.

19. The at least one non-transitory machine-readable medium of claim 17, wherein the at least one dimension to be analyzed comprises at least one grouping dimension for grouping data items, and the instructions to generate the plurality of candidate dimension combinations further comprising instructions to:

determine a plurality of grouping dimension candidates from the plurality of dimensions, each grouping dimension candidate comprising at least one of the plurality of dimensions;

determine, based on the dimension feature information, respective first metrics of the plurality of grouping dimension candidates being suitable for serving as grouping dimensions;

select a first predetermined number of grouping dimension candidates from the plurality of grouping dimension candidates based on the respective first metrics; and generate the plurality of candidate dimension combinations based on the first predetermined number of selected grouping dimension candidates.

20. The at least one non-transitory machine-readable medium of claim 19, wherein in the analysis pattern, the at least one grouping dimension acts as a corresponding analysis role in the analysis operation; and the instructions to generate the plurality of candidate dimension combinations based on the first predetermined number of selected grouping dimension candidates further comprising instructions to:

obtain a grouping dimension requirement associated with the analysis pattern, the grouping dimension requirement indicating the number of grouping dimensions required by each analysis role in the analysis pattern; and select, from the first predetermined number of selected grouping dimension candidates, grouping dimension candidates meeting the grouping dimension requirement to form the plurality of candidate dimension combinations.

\* \* \* \* \*